US012654422B2

(12) United States Patent
Kherkheulidze et al.

(10) Patent No.: US 12,654,422 B2
(45) Date of Patent: *Jun. 16, 2026**

(54) FLAMEPROOF MATERIAL FOR WEARABLES, PERSONAL PROTECTIVE EQUIPMENT, LITHIUM-ION BATTERY FLAME PROTECTION, AND GENERAL FLAME PROTECTION

(71) Applicant: Elven Technologies, Inc., Sacramento, CA (US)

(72) Inventors: Vamekh Kherkheulidze, Sacramento, CA (US); Giorgi Gabarashvili, Sacramento, CA (US); Alexandr Chubinidze, Sacramento, CA (US); Bela Butskhrikidze, Sacramento, CA (US); Farid Ismayilzada, Sacramento, CA (US)

(73) Assignee: ELVEN TECHNOLOGIES, INC., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/253,794

(22) Filed: Jun. 28, 2025

(65) Prior Publication Data

US 2025/0332811 A1      Oct. 30, 2025

Related U.S. Application Data

(63) Continuation-in-part of application No. 18/372,107, filed on Sep. 24, 2023.

(Continued)

(51) Int. Cl.
   B32B 5/26        (2006.01)
   B32B 5/02        (2006.01)
   (Continued)

(52) U.S. Cl.
   CPC ............. B32B 5/263 (2021.05); B32B 5/024 (2013.01); B32B 5/266 (2021.05); B32B 7/09 (2019.01);
   (Continued)

(58) Field of Classification Search
   None
   See application file for complete search history.

(56) References Cited

U.S. PATENT DOCUMENTS 2,573,414 A    10/1951   Dunn
2,966,684 A     1/1961   Bonin
(Continued)

FOREIGN PATENT DOCUMENTS

CN      104553091      4/2015
CN      110558646     12/2019
WO     2016013353      1/2016

OTHER PUBLICATIONS https://research-repository.rmit.edu.au/articles/thesis/Incorporation_of_aerogel_and_phase_change_material_in_textiles_for_thermal_protection/27590235?file=50760465 (Year: 2018).*

(Continued)

*Primary Examiner* — Arti Singh-Pandey
(74) *Attorney, Agent, or Firm* — SNELL & WILMER L.L.P.

(57)        ABSTRACT

Flameproof material for wearables, personal protective equipment, lithium-ion battery flame protection, and general flame protection are disclosed. A particular embodiment includes a flameproof material comprising: a first material being a combination of Oxidized Polyacrylonitrile (PAN) fiber and Para-aromatic polyamide (P-aramid) fiber; a second material being a combination of Oxidized PAN fiber, fire-resistant rayon (FR-rayon), and P-aramid fiber; and a third material being a combination of silica aerogel and (Continued)

fibrous glass configured for bonding with the first or second materials, the second material being configured for bonding with the first or third materials.

16 Claims, 27 Drawing Sheets

Related U.S. Application Data

(60) Provisional application No. 63/410,118, filed on Sep. 26, 2022.

(51) Int. Cl.
  *B32B 7/09* (2019.01)
  *B32B 7/12* (2006.01)
  *H01M 50/143* (2021.01)

(52) U.S. Cl.
  CPC ............ *B32B 7/12* (2013.01); *B32B 2250/03* (2013.01); *B32B 2250/20* (2013.01); *B32B 2262/0246* (2013.01); *B32B 2262/0269* (2013.01); *B32B 2262/108* (2013.01); *B32B 2307/3065* (2013.01); *H01M 50/143* (2021.01)

(56) References Cited

U.S. PATENT DOCUMENTS

| | | |
|---|---|---|
| 3,043,300 A | 7/1962 | Flagg |
| 3,242,979 A | 3/1966 | Shlosinger |
| 3,295,594 A | 1/1967 | Hopper |
| 3,348,236 A | 10/1967 | Copeland |
| 3,452,812 A | 7/1969 | Betts |
| 3,507,321 A | 4/1970 | Palma |
| 3,670,518 A | 6/1972 | Esposito |
| 3,743,012 A | 7/1973 | Laxo |
| 3,763,497 A | 10/1973 | Leach |
| 3,869,871 A | 3/1975 | Rybalko |
| 4,118,946 A | 10/1978 | Tubin |
| 4,172,454 A | 10/1979 | Warncke |
| 4,310,926 A | 1/1982 | Maroist |
| 4,513,452 A | 4/1985 | Rankin, Sr. |
| 4,691,762 A | 9/1987 | Elkins |
| 4,914,752 A | 4/1990 | Hinson |
| 4,998,415 A | 3/1991 | Larsen |
| 5,014,355 A | 5/1991 | Vollenweider, II |
| 5,088,115 A | 2/1992 | Napolitano |
| 5,098,770 A | 3/1992 | Paire |
| 5,320,164 A | 6/1994 | Szczesuil |
| 5,393,595 A | 2/1995 | Roussel |
| 5,421,326 A | 6/1995 | Rankin |
| 5,438,707 A | 8/1995 | Horn |
| 5,538,583 A | 7/1996 | Szczesuil |
| 5,774,902 A | 7/1998 | Gehse |
| 6,109,338 A | 8/2000 | Butzer |
| 6,209,144 B1 | 4/2001 | Carter |
| 6,228,784 B1 | 5/2001 | Mochizuki |
| 6,297,178 B1 | 10/2001 | Berbner |
| 6,551,347 B1 | 4/2003 | Elkins |
| 6,743,498 B2 | 6/2004 | Fourmeux |
| 6,957,697 B2 | 10/2005 | Chambers |
| 7,284,398 B2 | 10/2007 | Hubner |
| 7,348,059 B2 | 3/2008 | Zhu |
| 7,565,705 B2 | 7/2009 | Elkins |
| 7,744,999 B2 | 6/2010 | Zhu |
| 7,807,589 B2 | 10/2010 | Huang |
| 8,375,475 B2 | 2/2013 | Rose |
| 8,586,489 B2 | 11/2013 | Shteiyer |
| 8,793,814 B1 | 8/2014 | Diianni |
| 9,415,246 B2 | 8/2016 | Kuroda |

| | | | |
|---|---|---|---|
| 9,580,843 B2 | 2/2017 | Okuya | |
| 9,732,446 B2 | 8/2017 | Favier | |
| 9,918,502 B2 | 3/2018 | Oliver | |
| 10,076,153 B2 | 9/2018 | Gamer | |
| 10,137,662 B2 | 11/2018 | Nutt | |
| 10,213,634 B1 | 2/2019 | Maldonado | |
| 10,357,935 B2 | 7/2019 | Lee | |
| 10,450,679 B2 | 10/2019 | Matsumoto | |
| 10,626,306 B2 | 4/2020 | Goletto | |
| 10,711,394 B2 | 7/2020 | Yi | |
| 10,980,292 B2 | 4/2021 | Fan | |
| 11,078,608 B2 | 8/2021 | Tanaka | |
| 11,118,287 B2 | 9/2021 | Shimada | |
| 2002/0142132 A1 | 10/2002 | Fourmeux | |
| 2003/0019476 A1 | 1/2003 | Chambers | |
| 2004/0157521 A1 | 8/2004 | Monlini | |
| 2006/0042326 A1 | 3/2006 | Hubner | |
| 2006/0116043 A1 | 6/2006 | Hope | |
| 2006/0144557 A1 | 7/2006 | Koscheyev | |
| 2006/0191063 A1 | 8/2006 | Elkins | |
| 2006/0264136 A1 | 11/2006 | Chianlese | |
| 2010/0071119 A1 | 3/2010 | Thatcher | |
| 2010/0086763 A1 | 4/2010 | Huang | |
| 2011/0171469 A1 | 7/2011 | Shah | |
| 2012/0042442 A1 | 2/2012 | Takahashi | |
| 2012/0110721 A1 | 5/2012 | Takahashi | |
| 2012/0289763 A1 | 11/2012 | Boyden | |
| 2013/0212790 A1 | 8/2013 | Waxman | |
| 2015/0044924 A1 | 2/2015 | Yi | |
| 2015/0075185 A1 | 3/2015 | Sims | |
| 2016/0039170 A1 | 2/2016 | Nutt | |
| 2016/0040326 A1 | 2/2016 | Okuya | |
| 2018/0044561 A1 | 2/2018 | Goletto | |
| 2019/0105867 A1 | 4/2019 | Nutt | |
| 2020/0259144 A1* | 8/2020 | Kang | ..................... B32B 19/06 |
| 2020/0260531 A1 | 8/2020 | Gmbh | |
| 2020/0276789 A1 | 9/2020 | Tecnologia et al. | |
| 2020/0281284 A1 | 9/2020 | Mcallister | |
| 2021/0180920 A1 | 6/2021 | Bhandari et al. | |
| 2021/0227906 A1 | 7/2021 | Brahms et al. | |
| 2021/0352974 A1 | 11/2021 | Kirchmeier | |
| 2022/0251749 A1 | 8/2022 | Borchardt et al. | |

OTHER PUBLICATIONS

International Bureau, International Preliminary Report on Patentability dated Mar. 1, 2025 in International Application No. PCT/US2023/033567.

PCT International Search Report and Written Opinion, International Appl. No. PCT/US23/033578, Applicant: Elven Technologies, Inc., International Filing Date: Sep. 25, 2023, Mailing Date Mar. 11, 2024, 12 pages.

Shaid. "Incorporation of aerogel and phase change material in textiles for thermal protection", Doctoral thesis (online), RMIT University, Aug. 2018; Retrieved from the Internet on Dec. 19, 2023: < URL: https://core.ac. uk/download/pdf/185278046.pdf>; p. 17, paragraph 2; p. 20, paragraph 3.

PCT International Search Report and Written Opinion, International Appl. No. PCT/US23/33567, Applicant: Elven Technologies, Inc., International Filing Date: Sep. 24, 2023, Mailing Date Feb. 22, 2024, 15 pages.

USPTO; Requirement for Restriction dated Jul. 16, 2025 in U.S. Appl. No. 18/372,107.

International Searching Authority, International Preliminary Report on Patentability dated Mar. 1, 2025 in PCT Serial No. PCT/US2023/033578.

USPTO, Office Action dated Aug. 25, 2025 in U.S. Appl. No. 18/372,107.

USPTO, Office Action dated Aug. 20, 2025 in U.S. Appl. No. 18/372,211.

* cited by examiner

Fig. 1 - Legend 2D view 3D view 2D view 3D view 2D view 3D view 2D view 3D view 2D view 3D view 2D view 3D view 2D view 3D view Matrix Cap Layer 4

Layer 3

Layer 2

Layer 1

Base of Matrix

Fireproof material wrap for high-voltage poles.

High explosive armament bay and fuel tanks of armored vehicle outfitted
with flameproof material for protection from external fire.

Flameproof material used as lithium-battery enclosure in electric vehicle

Flameproof material used as lithium-battery enclosure in energy storage

Flameproof material used as atmospheric reentry heat shield for a spacecraft

Flameproof material used as internal layer for fireproofing a door

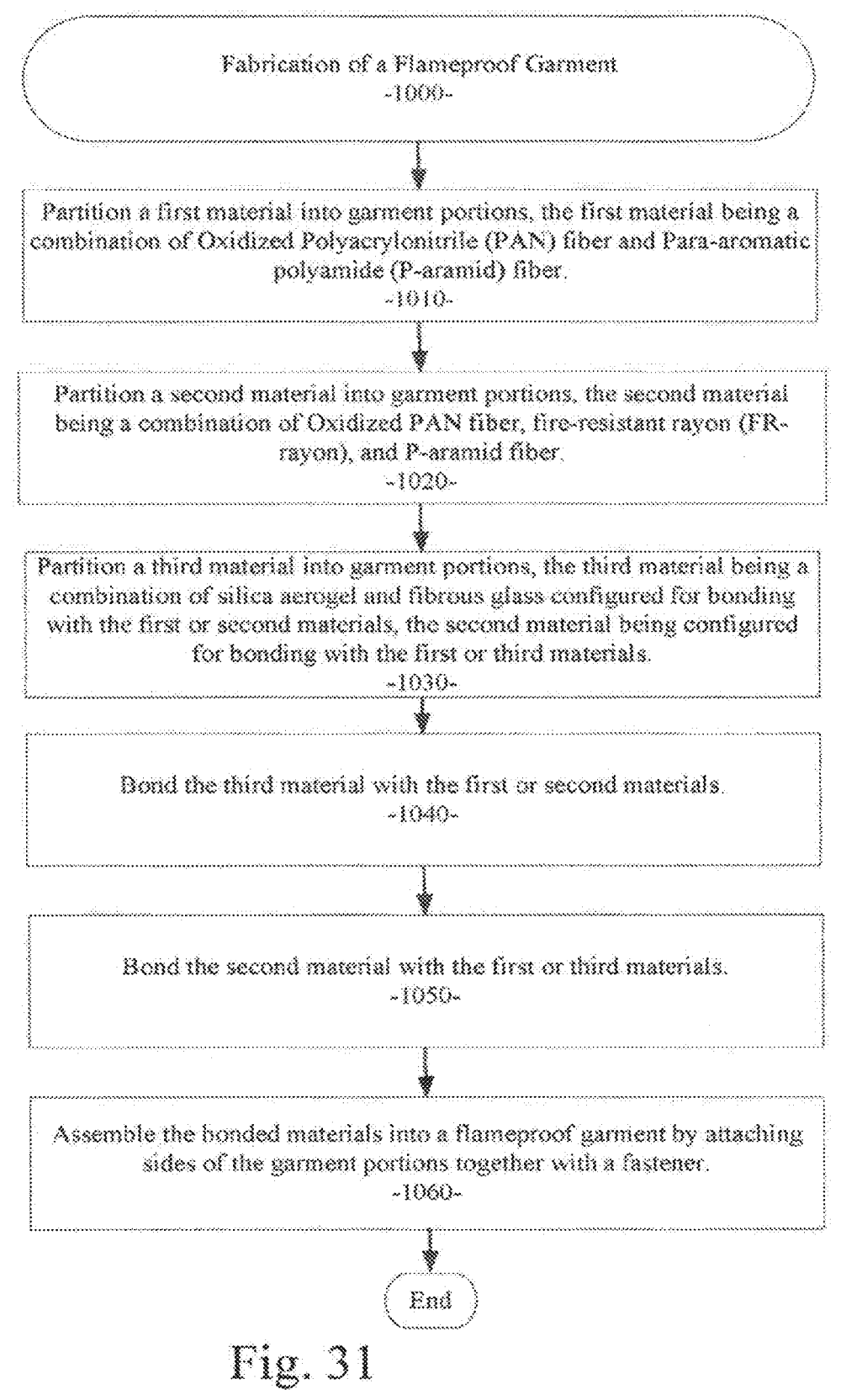

Fabrication of a Flameproof Garment
-1000-

Partition a first material into garment portions, the first material being a combination of Oxidized Polyacrylonitrile (PAN) fiber and Para-aromatic polyamide (P-aramid) fiber.
-1010-

Partition a second material into garment portions, the second material being a combination of Oxidized PAN fiber, fire-resistant rayon (FR-rayon), and P-aramid fiber.
-1020-

Partition a third material into garment portions, the third material being a combination of silica aerogel and fibrous glass configured for bonding with the first or second materials, the second material being configured for bonding with the first or third materials.
-1030-

Bond the third material with the first or second materials.
-1040-

Bond the second material with the first or third materials.
-1050-

Assemble the bonded materials into a flameproof garment by attaching sides of the garment portions together with a fastener.
-1060-

End

Fig. 31

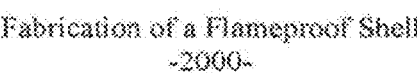

Fabrication of a Flameproof Shell
-2000-

Place a first material onto a matrix base, the first material being a combination of Oxidized Polyacrylonitrile (PAN) fiber and Para-aromatic polyamide (P-aramid) fiber.
-2010-

Place a second material onto a surface of the first material, the second material being a combination of Oxidized PAN fiber, fire-resistant rayon (FR-rayon), and P-aramid fiber.
-2020-

Place a third material onto a surface of the second material, the third material being a combination of silica aerogel and fibrous glass.
-2030-

Place a matrix cap onto a surface of the third material.
-2040-

Apply pressure to the matrix cap for a predetermined length of time.
-2050-

Remove the matrix base and the matrix cap from combined first, second, and third materials.
-2060-

Attach sides of the combined first, second, and third materials together with a fastener.
-2070-

Fig. 32

End

FLAMEPROOF MATERIAL FOR WEARABLES, PERSONAL PROTECTIVE EQUIPMENT, LITHIUM-ION BATTERY FLAME PROTECTION, AND GENERAL FLAME PROTECTION

CROSS REFERENCE TO RELATED APPLICATIONS

This non-provisional patent application claims priority to and is a continuation in part of U.S. patent application No. Ser. No. 18/372,107 filed Sep. 24, 2023. U.S. patent application No. Ser. No. 18/372,107 is a non-provisional patent application claiming priority to U.S. provisional patent application Ser. No. 63/410,118, filed Sep. 26, 2022. The entire disclosure of the referenced patent applications is considered part of the disclosure of the present application and is hereby incorporated by reference herein in their entirety.

FIELD

This patent application relates to flameproof and fire resistant materials, wearables, and equipment according to example embodiments, and more specifically to flameproof material for wearables, personal protective equipment, lithium-ion battery flame protection, and general flame protection.

BACKGROUND

Workers who have a high risk of contact with direct flame and high-temperatures (e.g., firefighters, stunt professionals, metal and foundry workers, race car drivers, etc.) and other workers who work in environments that are exposed to the danger of fires require fire-protective clothing having excellent durability and flame resistance. In some cases, fire-protective clothing usually includes an aramid fiber (e.g., a heat-resistant fiber) having high strength and flame resistance, which is used in a fabric for making fire-protective clothing. Some conventional fire-protective fabrics use a woven fabric including a para-aramid fiber in an amount of about 40% to 70% and a meta-aramid fiber in an amount of about 10% to about 40% as an outer shell woven fabric for use in firefighter fire-protective clothing. Other conventional fire-protective clothing uses a fabric made from a yarn including a meta-aramid fiber in an amount of 50 to 80 (% by weight) and a para-aramid fiber in an amount of 0 to 5 (% by weight) as a fabric suitable for use in fire protection. However, the conventional fire-protective fabrics use an aramid fiber at a high blending ratio. A high blending ratio of an aramid fiber results in increases in product prices and thus constitutes an obstacle to the spread of safe products. Additionally, the conventional fire-protective fabrics cannot achieve a level of effectiveness to assure the safety of the personnel using the fire-protective clothing.

SUMMARY

The example embodiments of the disclosed flameproof material for wearables, personal protective equipment, lithium-ion battery flame protection, and general flame protection relate to the creation of a flameproof material combination (e.g., a flameproof shell). The flameproof material combination may serve to enable the fabrication of different types of wearables and personal protective equipment for workers who have a high risk of contact with direct flame and high-temperatures (e.g., firefighters, stunt professionals, metal and foundry workers, race car drivers, etc.). Additionally, various embodiments disclosed herein can also be used to fabricate a flameproof shell in electric vehicle (EV) industries, aerospace, construction, and other industries and applications.

In various example embodiments, the flameproof shell disclosed herein can be used in various applications including:

Flameproof enclosures for lithium batteries (e.g., for electric vehicles, electric transportation ships, aircraft, energy storage, battery storage and recycling, etc.), and high-temperature furnaces (smelting, melting, metal formation, fire-test sites, etc.); (See FIG. 27 and FIG. 28)

Flameproof solutions for walls, doors, etc. in construction industry; (See FIG. 30)

Aeronautics and space industries; (See FIG. 29)

Wearables and personal protective equipment for workers who have a high risk of contact with direct flame and high-temperatures (e.g., firefighters, stunt professionals, metal and foundry workers, race car drivers, etc.);

Fire and temperature protection wearables for military personnel, as well as fire and temperature protection for military machinery and equipment, and armament boxes and storage; (See FIG. 26) and Flameproof wraps for high-voltage lines, poles, generator systems and infrastructure. (See FIG. 25)

Details of example embodiments of the disclosed flameproof material for wearables, personal protective equipment, lithium-ion battery flame protection, and general flame protection are provided below.

BRIEF DESCRIPTION OF THE DRAWINGS

The various embodiments are illustrated by way of example, and not by way of limitation, in the figures of the accompanying drawings in which:

FIGS. 31 and 32 illustrate process flow diagrams that show example embodiments of methods as described herein.

DETAILED DESCRIPTION

In the following description, for purposes of explanation, numerous specific details are set forth in order to provide a thorough understanding of the various embodiments. It will be evident, however, to one of ordinary skill in the art that the various embodiments may be practiced without these specific details.

As used herein, the terms "tow" and "cable" are used to refer to one or more strands of substantially continuous filaments. Thus, a "tow" or "cable" may refer to a plurality of strands of substantially continuous filaments or a single strand of substantially continuous filament, respectively. "Fiber bundle" may refer to a tow of substantially continu-ous filaments. "Fiber bundle" may also refer to various formats of narrow strips of stretch broken fibers. "Spiral" fabric may also be referred to herein as "helical" fabric. A "textile" may be referred to as a "fabric" or a "tape." A "loom" may refer to any weaving device, such as a narrow fabric needle loom.

As used herein, the term "ribbon" is used to refer to a closely packed bundle of continuous filaments and discon-tinuous filaments like stretch broken fibers generally deliv-ered from a spool. A "span" as used herein may be a length of ribbon and/or tow. As used herein, the term "yarn" is used to refer to a strand of substantially continuous fibers or staple fibers or blends of these, thus the term "yarn" encompasses tow and cable. As used herein, the unit "K" represents "thousand." Thus, a 1 K tow means a tow comprising about 1,000 strands of substantially continuous filaments. For example, a "heavy tow" may comprise about 48,000 (48 K) or more textile fibers in a single tow, whereas a "medium tow" may comprise about 24,000 (24 K) textile fibers within a single tow whereas a "lighter tow" may comprise about 6,000 (6 K) or fewer textile fibers within a single tow. Fewer or greater amounts of textile fibers may be used per cable in various embodiments. In various embodiments disclosed herein, fabrics in accordance with various embodiments may comprise tows of from about 0.1 K to about 100 K, and, in various embodiments, heavier tows. As is understood, "warp" fibers are fibers that lie in the "warp" direction in the textile, i.e., along the length of the textile. "Weft" fibers are fibers that lie in the "weft" direction in the textile, i.e., along the width of the textile. Warp fibers may be described as being spaced apart with respect to the weft direction (i.e., spaced apart between the outer diameter (OD) and inner diameter (ID) of the textile). Similarly, the weft tows may be described as being spaced apart with respect to the warp direction.

Figure 1:
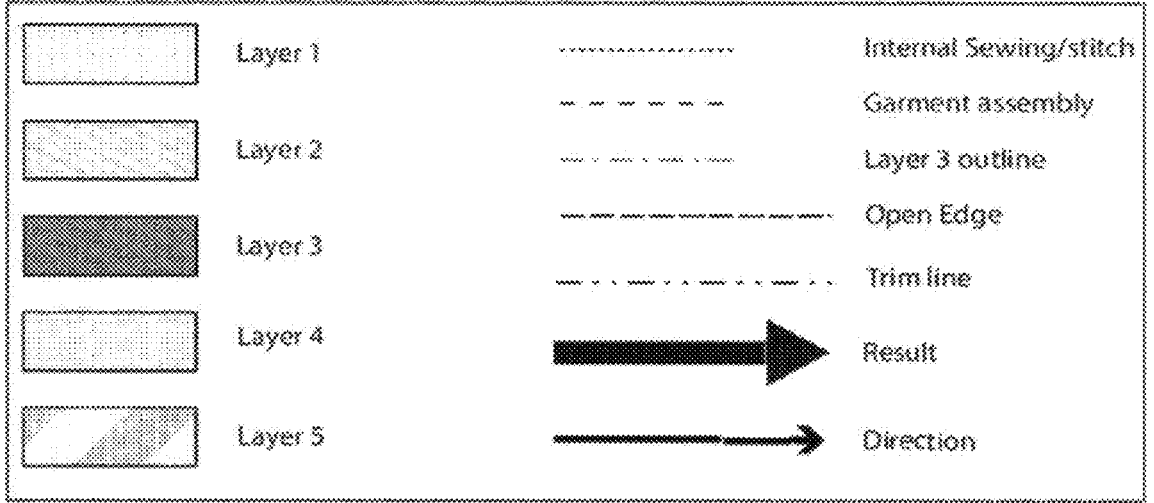
FIG. 1 illustrates a legend showing each of five material layers used in the flameproof shell of the example embodiments and associated with shading patterns as shown in the subsequent figures.
Figure 2:
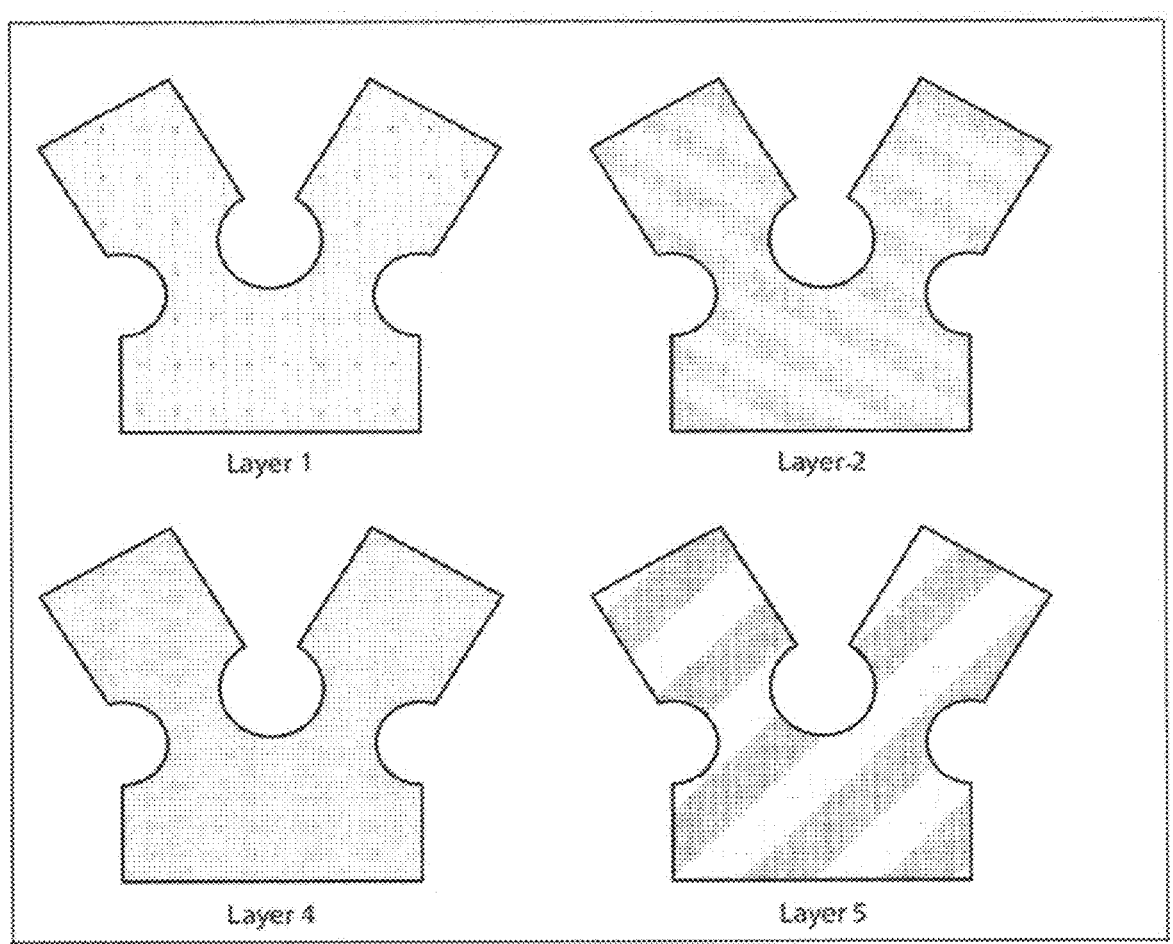
FIG. 2 illustrates a method step of an example embodiment wherein layers 1, 2, 4, and 5 are cut or otherwise partitioned into garment patterns.
Figure 3:
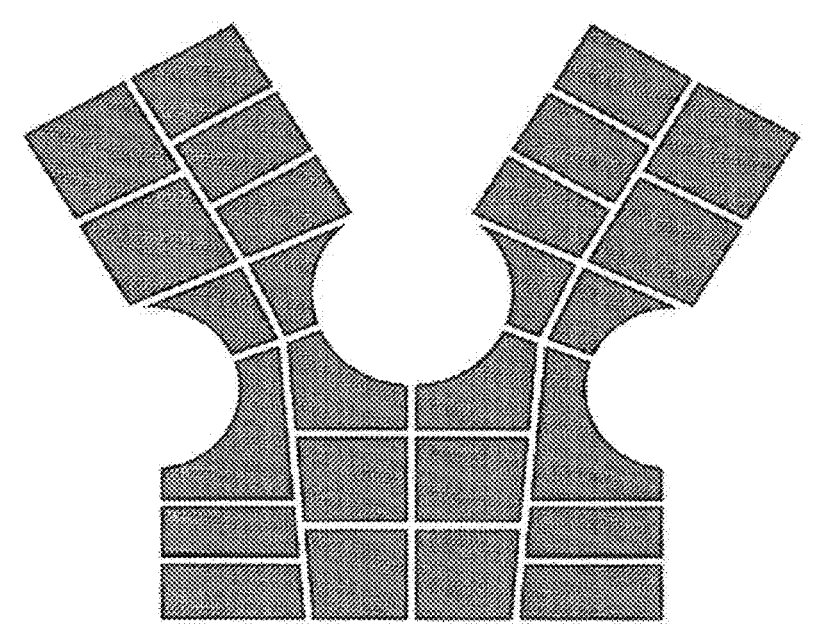
FIG. 3 illustrates a method step of an example embodiment wherein layer 3 is cut or otherwise partitioned into individually shaped pieces.
Figure 4:
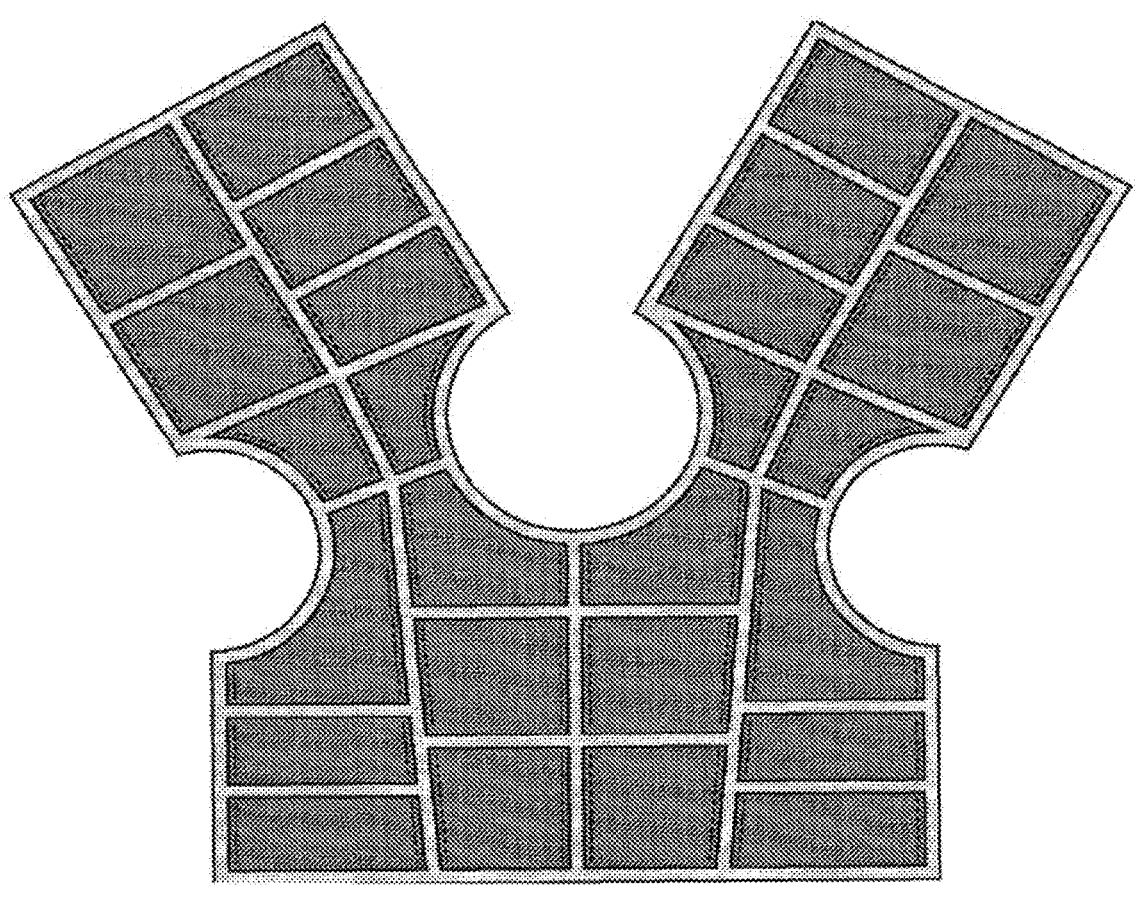
FIG. 4 illustrates a method step of an example embodiment wherein individually shaped pieces of layer 3 are linked to pre-cut layer 4 using a fastener, such as aramid thread, other fire-resistant fiber thread or adhesive.
Figure 5:
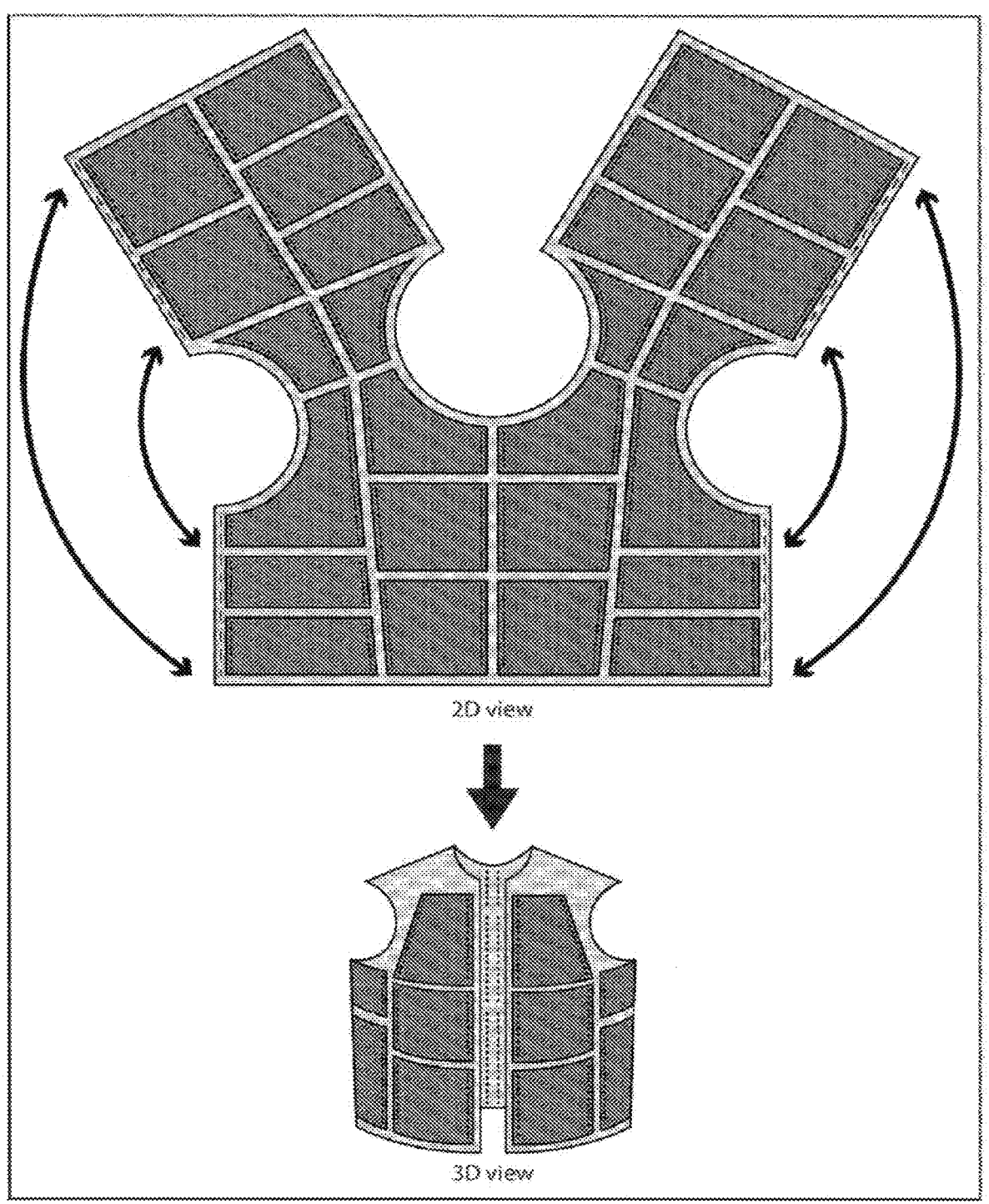
FIG. 5 illustrates a method step of an example embodiment wherein layer 4 together with attached layer 3 is assembled as a garment by attaching the sides together with a fastener, such as aramid thread or other fire-resistant fiber.
Figure 6:
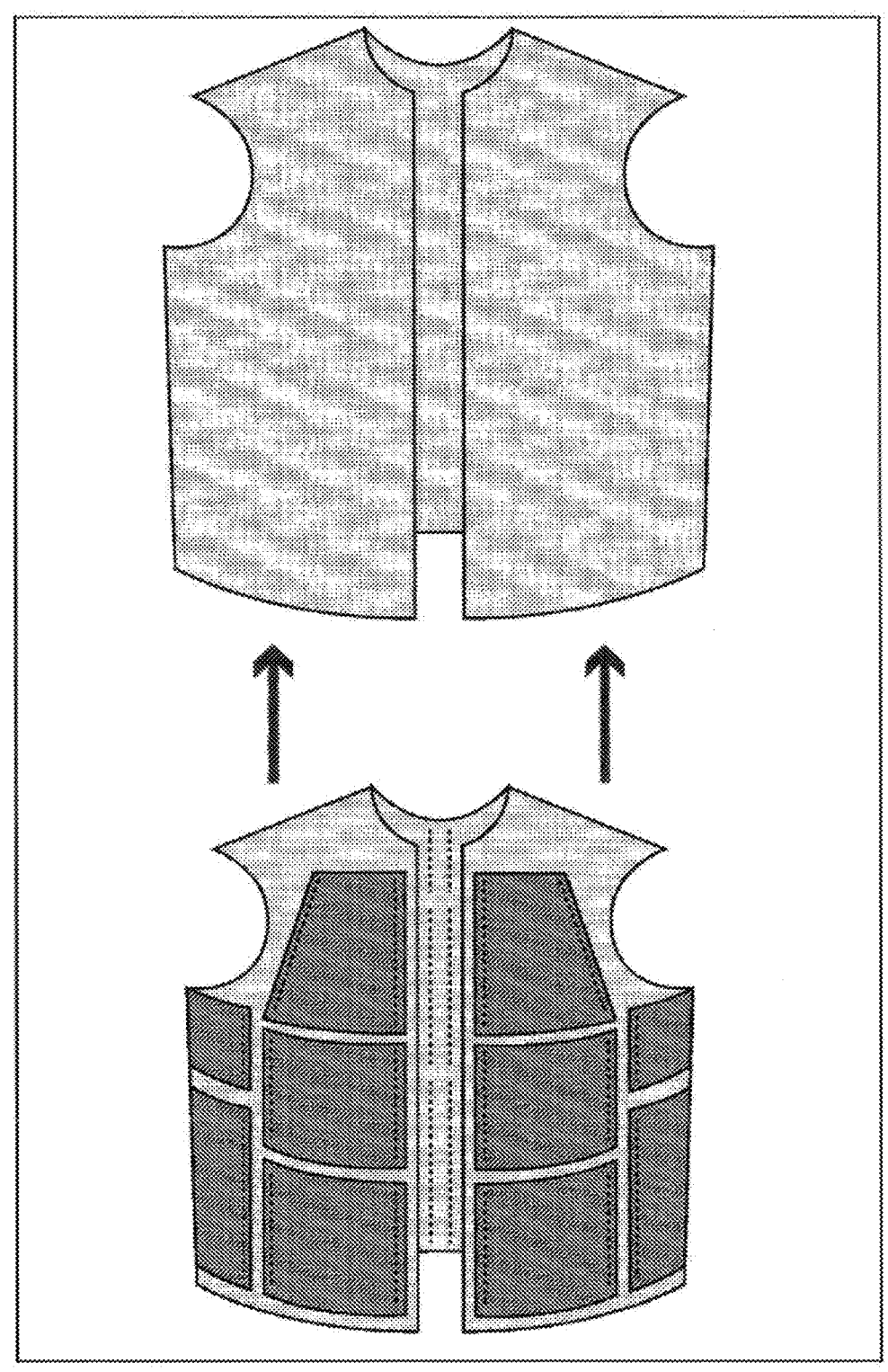
FIGS. 6 and 7 illustrate a method step of an example embodiment wherein the pre-assembled garment from layer 2 is placed on top of the pre-assembled garment from layers 4 and 3 and attaching the open edges together with a fastener, such as aramid thread or other fire-resistant fiber.
Figure 7:
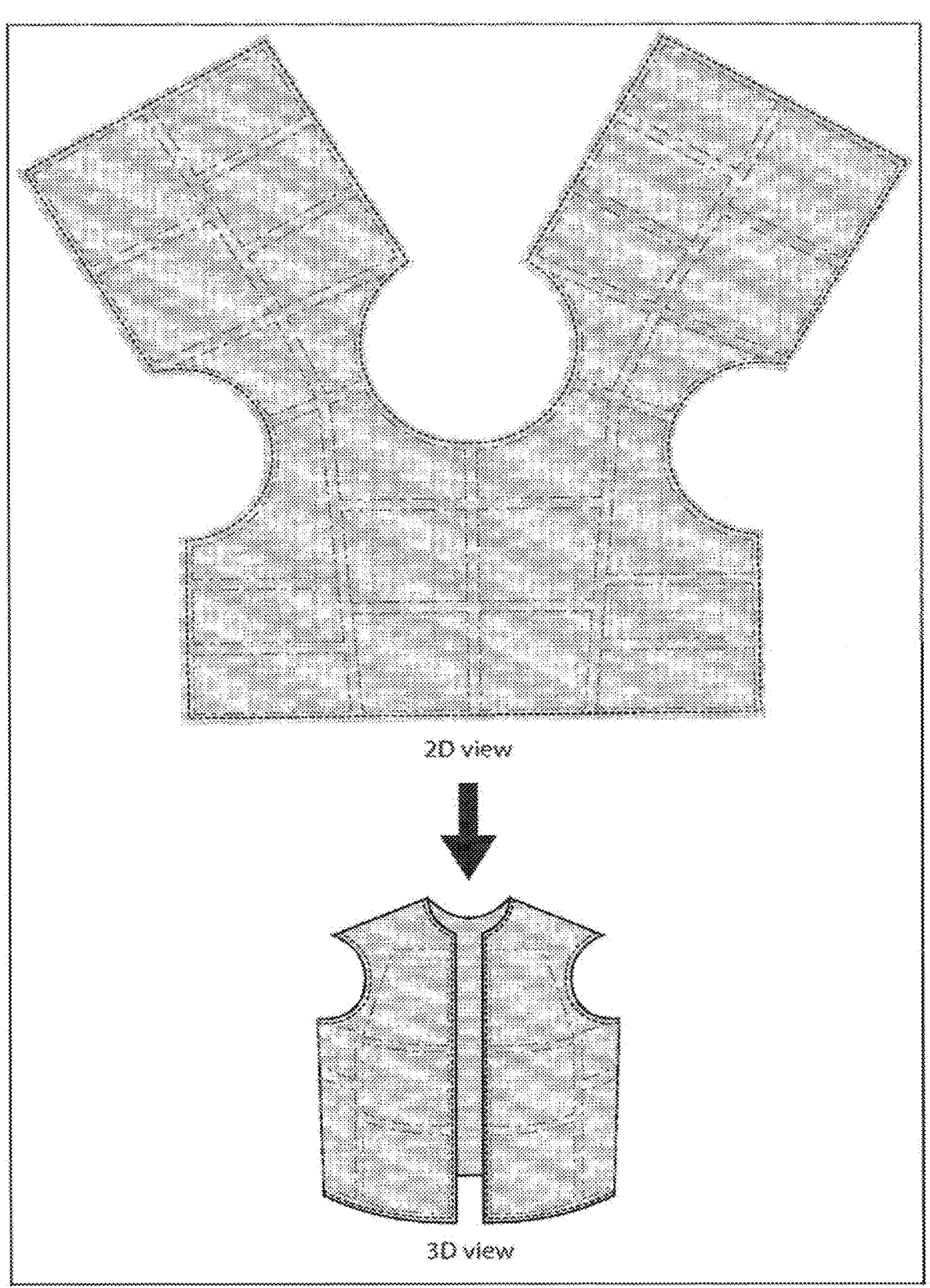
Figure 8:
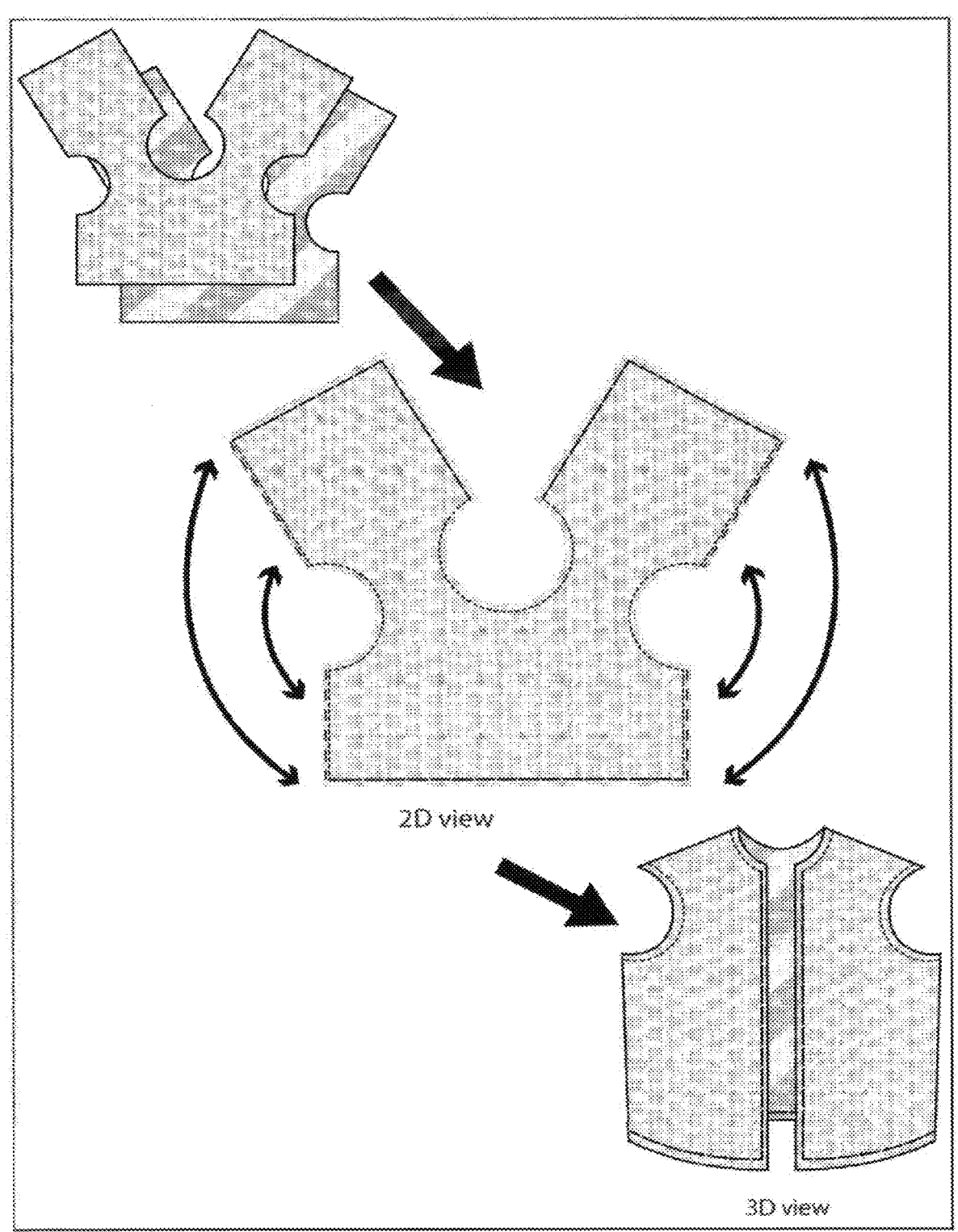
FIG. 8 illustrates a method step of an example embodiment wherein the pre-cut layer 1 and an optional moisture wicking layer are placed together edge to edge, and sewn into a separate garment at the overlapping edges, except for the open edges defined for a specific garment.

In the various embodiments described herein, flameproof material for wearables, personal protective equipment, lithium-ion battery flame protection, and general flame protection are disclosed. Referring to FIG. 1, a Legend is disclosed, which identifies a shading pattern associated with each of the five material layers used in an example embodi-ment of the flameproof material for wearables. In addition, the Legend of FIG. 1 shows a pattern associated with the stitching, assembly, outlines, and edges of the flameproof material for wearables. These patterns are shown in the subsequent figures provided herein to illustrate the compo-sition and manufacturing processes used in the example embodiment of the flameproof material for wearables dis-closed herein. Details of these composition and manufac-turing processes used in the example embodiments of the disclosed flameproof material for wearables, personal pro-tective equipment, lithium-ion battery flame protection, and general flame protection are provided below.

Composition of the Flameproof Material of Various Example Embodiments

Referring again to FIG. 1, the flameproof shell of the example embodiments is comprised of several layers of materials, arranged in a specific order, and linked or bonded to (or configured for bonding with) each other in a specific manner. The list and order of the layers of materials for an example embodiment is listed in Table 1 (see below) from the external side (flame side) to the internal side (skin side). In various example embodiments, the layers of the flameproof shell can be arranged as follows:

1. Layer One (the layer facing flame or source of heat): see the list of materials used as Layer 1 in Tables 1, 2A, and 2B.
2. Layer Two: see the list of materials used as Layer 2 in Tables 1, 2A, and 2B.
3. Layer Three: see the list of materials used as Layer 3 in Tables 1, 2A, and 2B.
4. Layer Four: see the list of materials used as Layer 4 in Tables 1, 2A, and 2B.
5. Layer Five: see the list of materials used as Layer 5 in Tables 1, 2A, and 2B.
6. Adhesives, such as glue: applied between the layers to fill out the air pockets and stick the layers together: see the list of materials used as the Glue in Tables 1, 2A, and 2B.

It will be understood by those of ordinary skill in that art that not all layers and/or adhesives are present in every embodiment of this disclosure. Indeed, the layers may be duplicated or omitted as described and claimed herein for various purposes.

The composition of these layers of materials is also listed below as Material 1 through Material 7 with Material 1 being the external side material and Material 7 being the skin side material. Additionally, the example embodiments can optionally include a Material 6, which serves as a moisture wicking barrier/layer. Each of these layers of materials is described below and associated with shading patterns as shown in FIG. 1—Legend.

As disclosed herein, the references to specific materials, various acronyms, and abbreviations are defined, explained, and detailed as follows:

1. O-PAN—or Oxidized PAN—Oxidized Polyacrylonitrile—a type of a synthetic Fire-resistant (FR) fiber.
2. P-aramid—or Para-aramid—Para-aromatic polyamide fiber, a type of a synthetic Fire-resistant fiber.
3. PTFE—Polytetrafluoroethylene—a type of hydrophobic (water-resistant) material.
4. PBI—Polybenzimidazole—a type of a synthetic Fire-resistant fiber, with especially high decomposition temperature.
5. FR-rayon—Rayon (Rayon is a semi-synthetic fiber, made from natural sources of regenerated cellulose, such as wood and related agricultural products—also called Viscose) treated with fire-resistant (FR) chemicals.

The flameproof shell of the example embodiments disclosed herein can be manufactured in at least two different configurations as described below:

1. A 4-layer configuration (all four layers are used during manufacturing)—See Table 2A; or
2. A 3-layer configuration (only Layer 1, Layer 2, and Layer 3 are used during manufacturing)—See Table 2B.

An additional layer 5 can be added to the 4-layer configuration for wearable products for comfort of the customer; but, layer 5 has no effect on the flame and heat resistance of the flameproof shell, and hence is an optional layer. Nevertheless, Layer 5 can become a part of the manufacturing process and so will be described below in connection with the disclosed manufacturing methodology.

Manufacturing Methods for the Flameproof Material of Various Example Embodiments with or without Adhesives Referring now to FIGS. 2 through 16, the flameproof shell of the example embodiments can be fabricated using the manufacturing methods disclosed below. When assembled, the flameproof shell of the example embodiments is semi-flexible and does not behave as a typical all-fabric combination based garment might behave. Thus, conventional clothing or garment manufacturing and sewing techniques are inadequate for fabricating the flameproof shell of the example embodiments into a wearable flameproof garment. This fabrication issue is solved by designing an armor comprised of a plurality of (e.g., over 300) individually shaped pieces. Then, this plurality of pieces is assembled into a wearable flameproof garment using one or more of the various manufacturing methods as described in detail below.

During manufacture of the flameproof shell of the example embodiments, different materials can be used as different layers. See Tables 2A and 2B for a description of the types of combinations of layers and materials that can be used. For the manufacture of wearable garments, a Layer Five can be added (towards the skin side of the garment), which is not a required part of the flameproof shell of the example embodiments, and serves as a Moisture Management and Ventilation Layer. See Table 1 for materials used as a Moisture Management and Ventilation Layer.

When fabricating the flameproof shell of the example embodiments, glue or other adhesives can be either added or not added between the layers, depending on the specificity of the target application. The material and layer configurations described in Tables 2A and 2B can be manufactured with or without using glue or other adhesives between different layers. The presence of glue or other adhesives between the layers is denoted as a symbol—(G) in this disclosure. For example, various layer configurations using glue or other adhesives can include: 1G2G4G3 (glue between every layer), 12G4G3 (glue between two layers), 1G243 (glue on a single layer), etc. Various configurations of the example embodiments can be fabricated as disclosed herein (see Tables 2A and 2B), but with different glue content or the absence of glue or other adhesives.

Method 1 for assembling an entire wearable flameproof garment of an example embodiment includes the following method steps:

1. Layers 1, 2, 4, and 5 (the optional moisture management and ventilation layer) are cut or otherwise partitioned into garment patterns or application-specific portions (See FIG. 2).
2. Layer 3 is cut or otherwise partitioned into individually shaped pieces (See FIG. 3). Note that the shapes shown in the figures are demonstrative examples and can be fabricated in a variety of different designs using the techniques disclosed herein.
3. (Either/Or step) These pieces are placed and linked or bonded to pre-cut Layer 4 using aramid (e.g., Kevlar or Nomex) thread (See FIG. 4) or bonded using an adhesive (e.g., glue), which is prepared and applied as a thin layer to these pieces to the side facing Layer 4.
4. Layer 4 together with attached Layer 3 is assembled as a garment by attaching the sides together with a fastener, such as aramid thread (or other fire-resistant fiber), and/or an adhesive as described herein (See FIG. 5).
5. (Optional step) An adhesive (e.g., glue) is prepared and applied as a thin layer to the pre-assembled garment from Layer 2, to the side facing Layers 3 and 4 (to the internal side of the Layer 2 garment).

6. The pre-assembled garment from Layer 2 is placed on top of the pre-assembled garment from Layers 4 and 3 and sewn at the open edges (e.g., wrist collars, neck collar, ankle collars, waist or hip line, and other free hanging cut edges) using aramid (e.g., Kevlar or Nomex) thread (See FIGS. 6 and 7).

7. Pre-cut Layer 1 and an optional Layer 5 moisture management and ventilation layer are placed together edge to edge, and sewn into a separate garment at the overlapping edges, except for the open edges defined for a specific garment, e.g., jacket front zipper and lower end area as shown in the figures (See FIG. 8).

8. Open edges left unsewn in the Layer 1 and the optional Layer 5 moisture management and ventilation layer are used to place the pre-assembled garment from Layers 2, 3, and 4 into the pre-assembled garment from Layer 1 and the optional Layer 5 moisture management and ventilation layer (See FIG. 9).

9. In the case of fabricating a one-piece (inseparable) garment, pre-assembled Layers 1 and the optional Layer 5 moisture management and ventilation layer and pre-assembled Layers 2, 3, and 4 are connected to one another at all the edges (including open edges) using aramid (e.g., Kevlar or Nomex) thread (See FIG. 10).

10. In the case of fabricating a separable garment, where pre-assembled Layers 2, 3, and 4 are removable from pre-assembled Layer 1 and the optional Layer 5 moisture management and ventilation layer, the pre-assembled Layer 1 and the optional Layer 5 moisture management and ventilation layer and pre-assembled Layers 2, 3, and 4 are connected to one another only at the open edges either using a separable fastener, such as zippers, knobs, Velcro™ strips, or magnets (See FIG. 11).

Method 2 for assembling an entire wearable flameproof garment of an example embodiment includes the following method steps:

1. Layers 1, 2, 3, 4, and 5 (the optional moisture management and ventilation layer) are cut or otherwise partitioned into predefined shapes (See FIG. 12).

2. (Optional step) An adhesive (e.g., glue) is prepared and applied as a thin layer to pieces to either or both sides of Layer 3.

3. Layers 2, 3, and 4 are aligned together in the same order and sewn into individual pieces, along all the edges using aramid (e.g., Kevlar or Nomex) thread (See FIG. 13). In the case of fabricating a single piece, Layer 1 is added on the free side of Layer 2 and sewn with the same suture.

4. Individual pieces are placed in their respective places, as the individual pieces (with Layers 2, 3, and 4) fit each other like a jigsaw puzzle, and sewn together on all the overlapping edges using aramid (e.g., Kevlar or Nomex) thread and assembled as a garment, by attaching the sides together with a fastener, such as aramid thread or other fire-resistant fiber (See FIG. 14).

5. Pre-cut Layer 1 and the optional Layer 5 moisture management and ventilation layer are placed together edge to edge, and sewn into a separate garment at the overlapping edges, except for the open edges defined for a specific garment, e.g., jacket front zipper and lower end area as shown in the figures (See FIG. 8).

6. Open edges left unsewn in the Layer 1 and the optional Layer 5 moisture management and ventilation layer are used to place the pre-assembled garment from Layers

Figure 9:
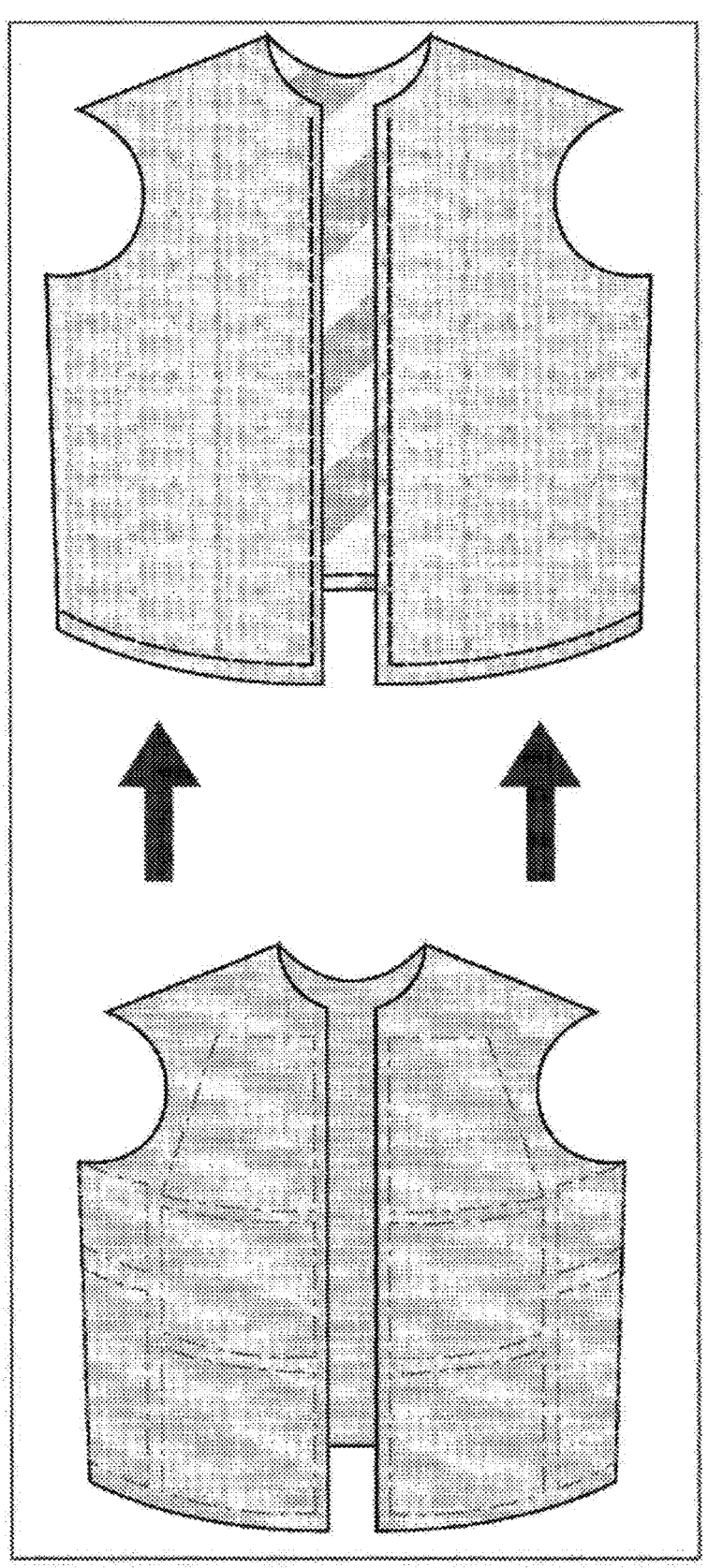
FIG. 9 illustrates a method step of an example embodiment wherein open edges left unsewn in the layer 1 and an optional moisture wicking layer are used to place the pre-assembled garment from layers 2, 3, and 4 into the pre-assembled garment from layer 1 and the optional moisture wicking layer.
Figure 10:
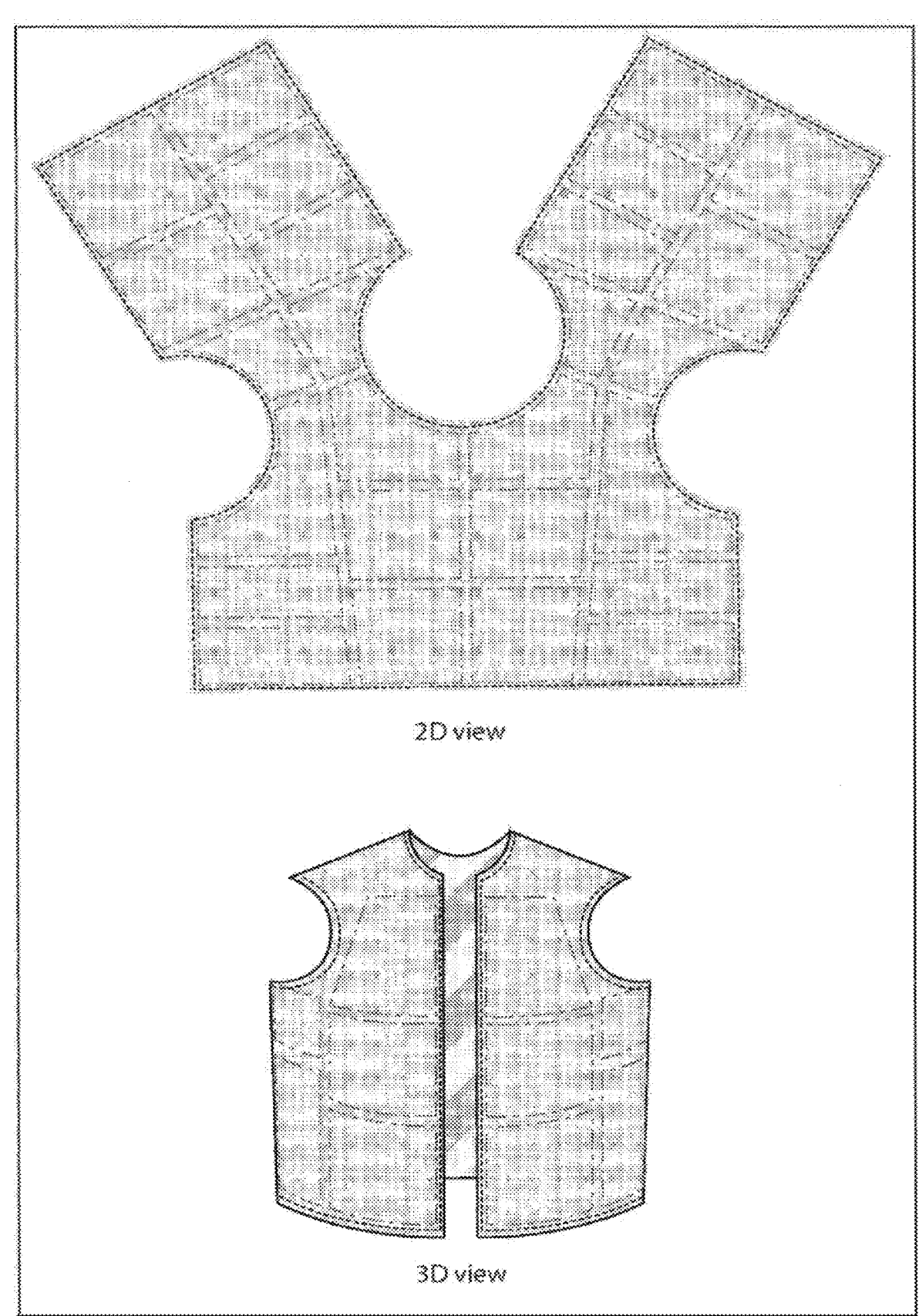
FIG. 10 illustrates a method step of an example embodiment wherein, in the case of fabricating a one-piece (insepa-rable) garment, pre-assembled layer 1 and an optional mois-ture wicking layer and pre-assembled layers 2, 3, and 4 are connected to one another at all the edges (including open edges) using a fastener, such as aramid thread or other fire-resistant fiber.
Figure 11:
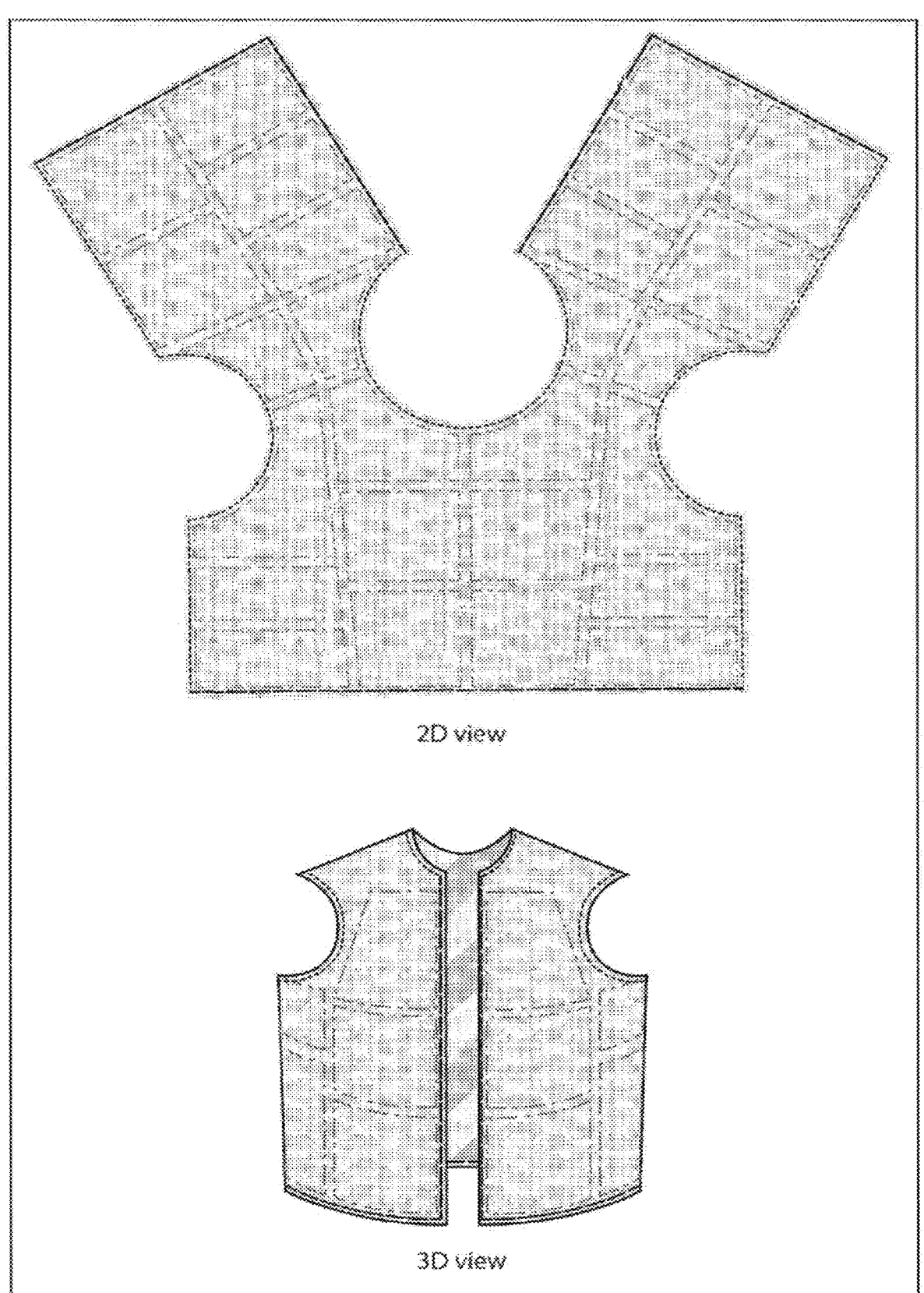
FIG. 11 illustrates a method step of an example embodi-ment wherein, in the case of fabricating a separable garment, where pre-assembled layers 2, 3, and 4 are removable from the pre-assembled layer 1 and an optional moisture wicking layer, the pre-assembled layer land the optional moisture wicking layer and the pre-assembled layers 2, 3, and 4 are connected to one another only at the open edges either using a separable fastener, such as zippers, knobs, hook and loop strips (e.g., Velcro™ strips), or magnets.
Figure 12:
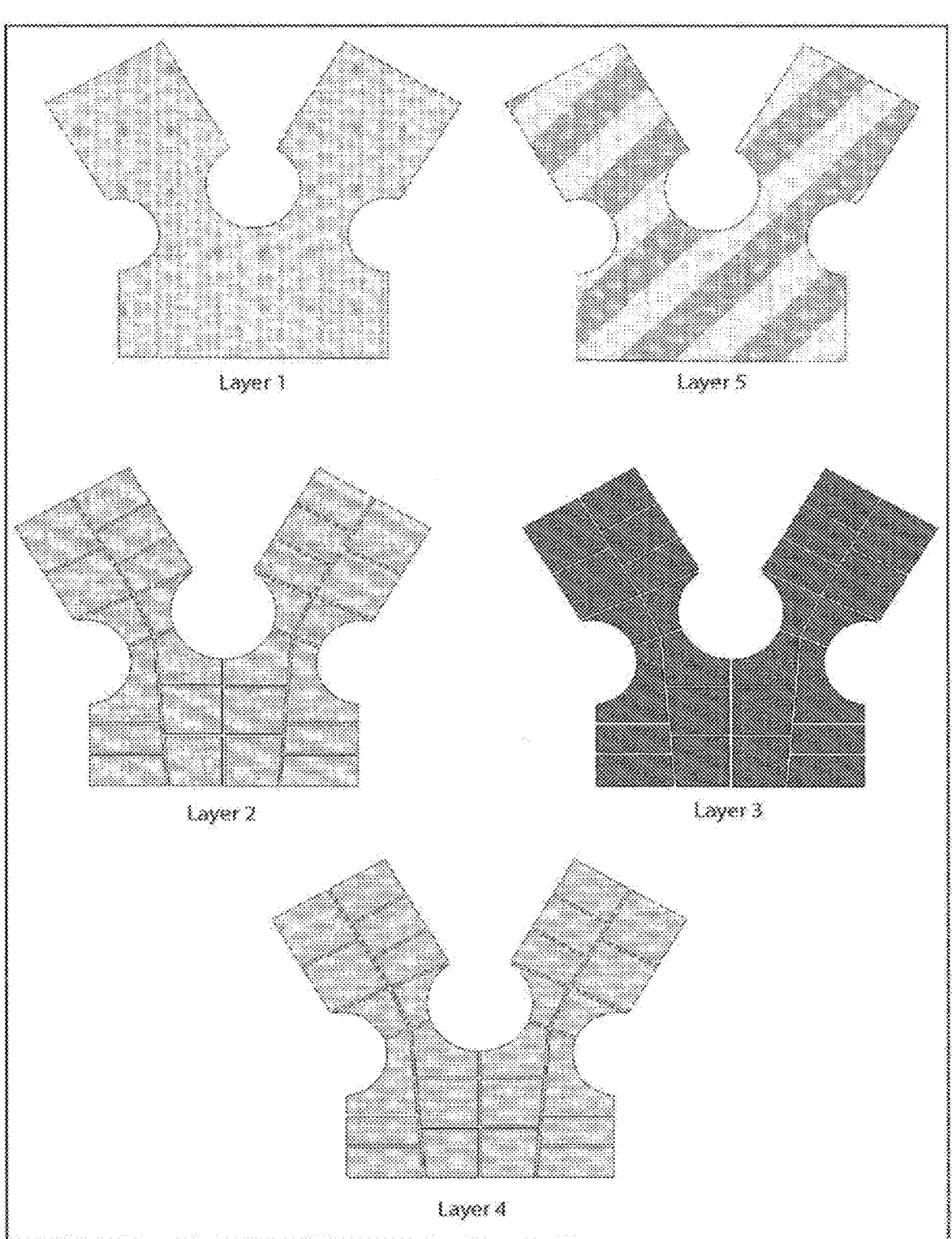
FIG. 12 illustrates a method step of an example embodi-ment wherein layers 1, 2, 3, 4, and 5 are cut or otherwise partitioned into predefined shapes.
Figure 13:
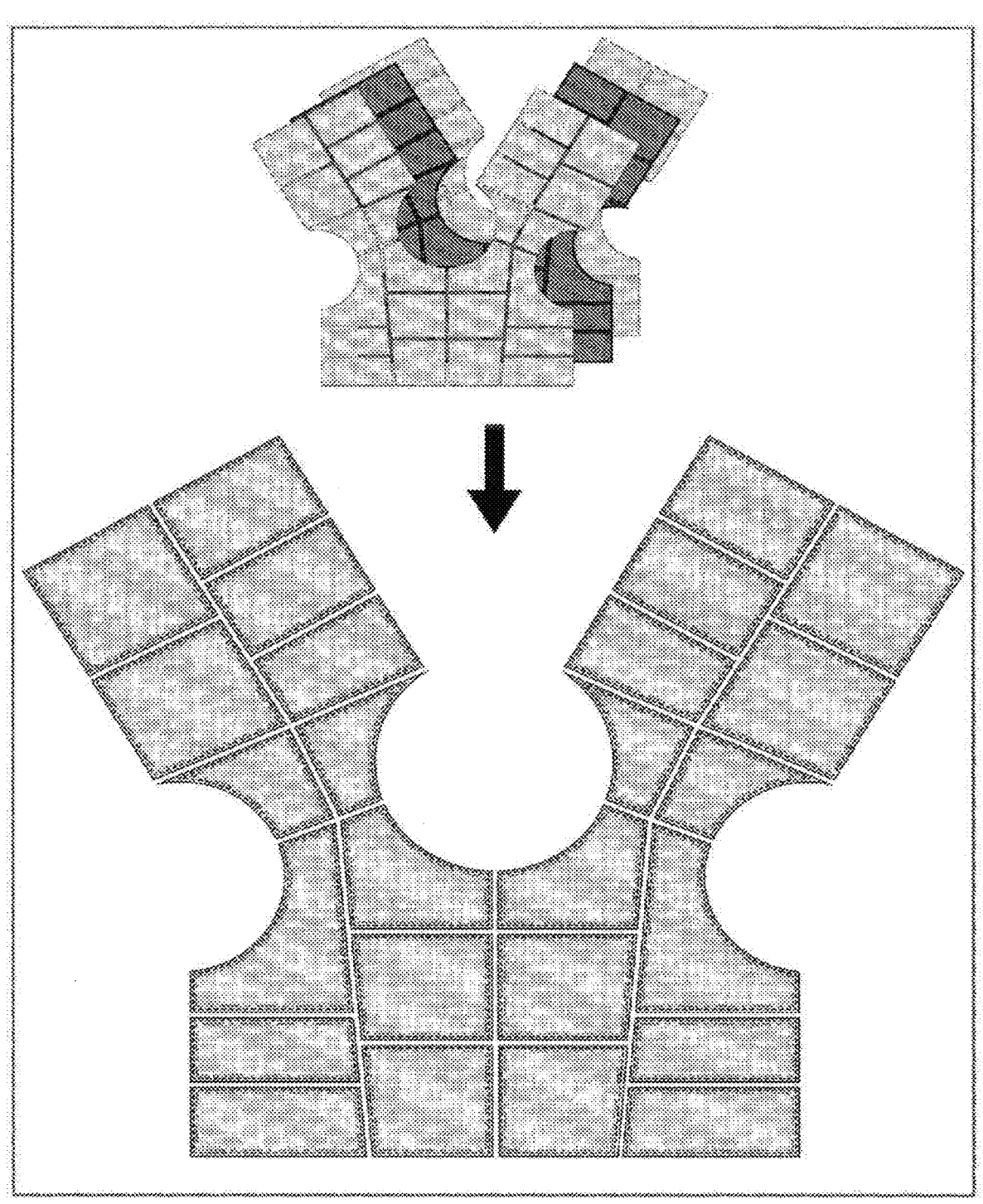
FIG. 13 illustrates a method step of an example embodi-ment wherein layers 2, 3, and 4 are aligned together in the same order and attached into individual pieces, along all the edges using a fastener, such as aramid thread or other fire-resistant fiber.
Figure 14:
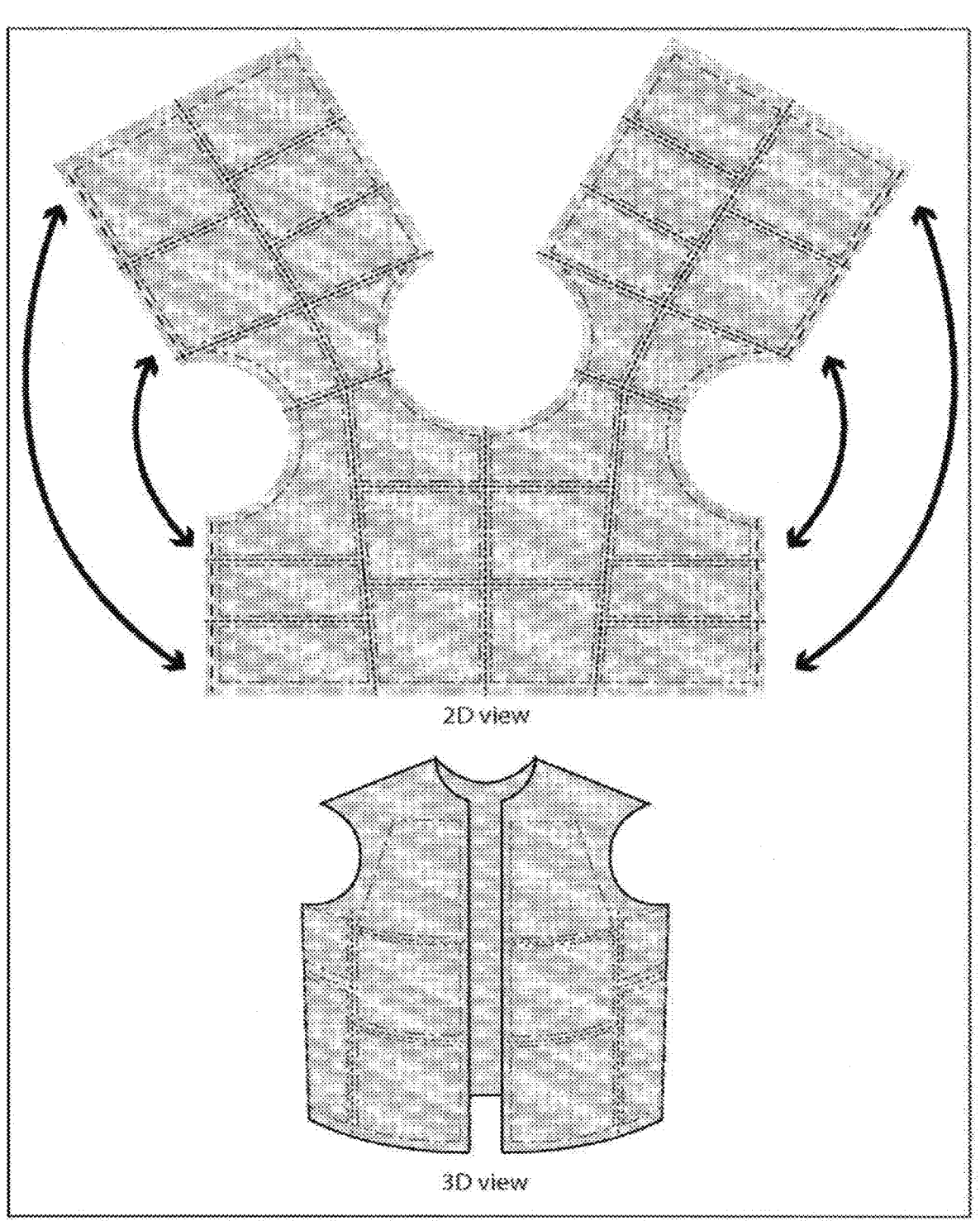
FIG. 14 illustrates a method step of an example embodi-ment wherein individual pieces are placed in their respective places, as the individual pieces (with layers 2, 3, and 4) fit each other like a jigsaw puzzle, and attached together on all the overlapping edges using a fastener, such as aramid thread or other fire-resistant fiber, and assembled as a garment, by attaching the sides together with aramid thread or other fire-resistant fiber.

2, 3, and 4 into the pre-assembled garment from Layer 1 and the optional Layer 5 moisture management and ventilation layer (See FIG. 9).

7. In the case of fabricating a one-piece (inseparable) garment, pre-assembled Layer 1 and the optional Layer 5 moisture management and ventilation layer and pre-assembled Layers 2, 3, and 4 are connected to one another at all the edges (including open edges) using aramid (e.g., Kevlar or Nomex) thread (See FIG. 10).

8. In the case of fabricating a separable garment, where pre-assembled Layers 2, 3, and 4 are removable from pre-assembled Layer 1 and the optional Layer 5 moisture management and ventilation layer, the pre-assembled Layer 1 and the optional Layer 5 moisture management and ventilation layer and pre-assembled Layers 2, 3, and 4 are connected to one another only at the open edges either using a separable fastener, such as zippers, knobs, Velcro™ strips, or magnets (See FIG. 11).

Figure 15:
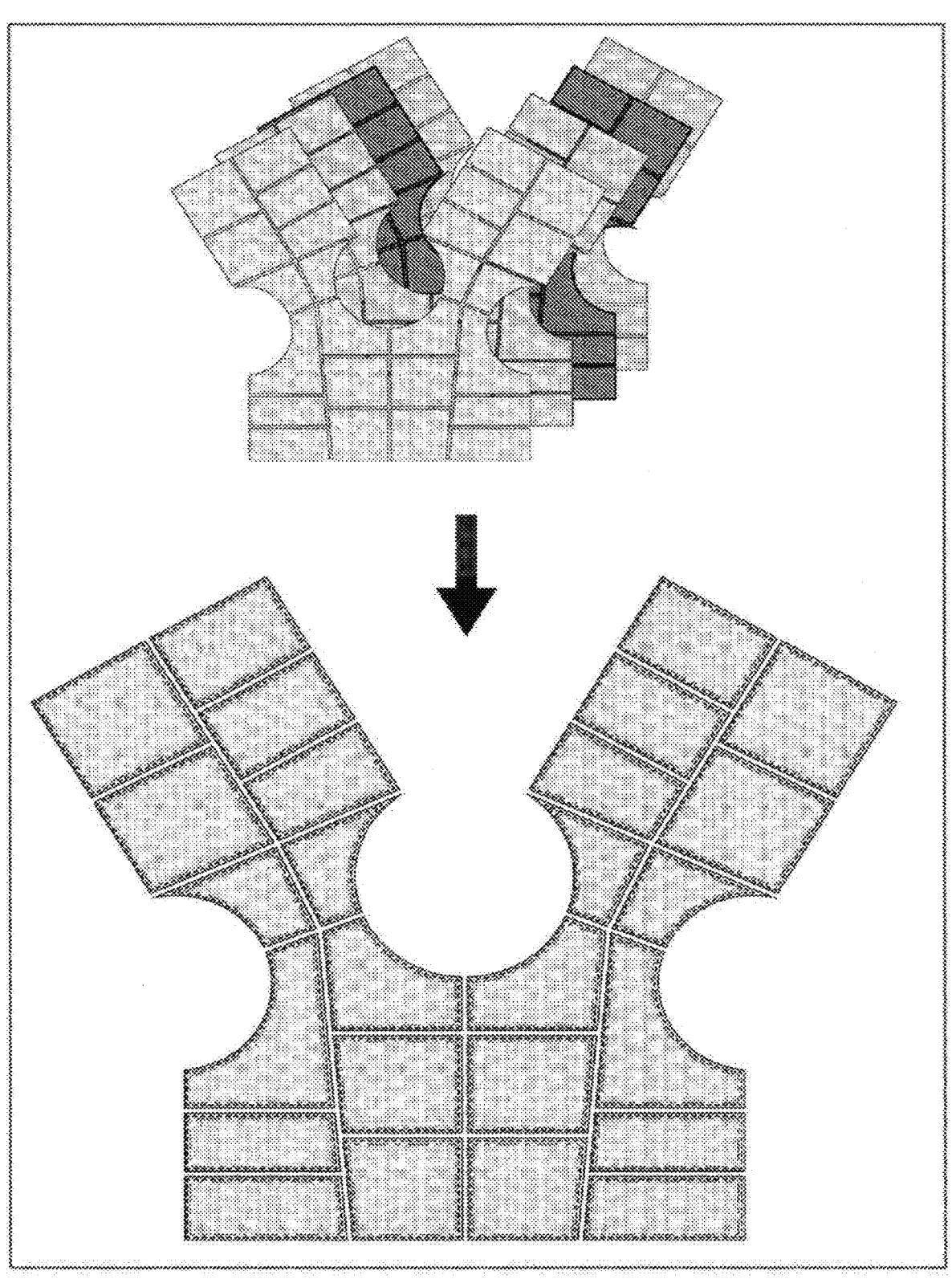
FIG. 15 illustrates a method step of an example embodi-ment wherein all four materials are connected together into individual pieces.

Method 3 for assembling an entire wearable flameproof garment of an example embodiment includes the following method steps:

1. Connect all four materials together into individual pieces as shown in FIG. 15, with or without using adhesives between layers 1 and 2, layers 2 and 3, and layers 3 and 4.

Figure 16:
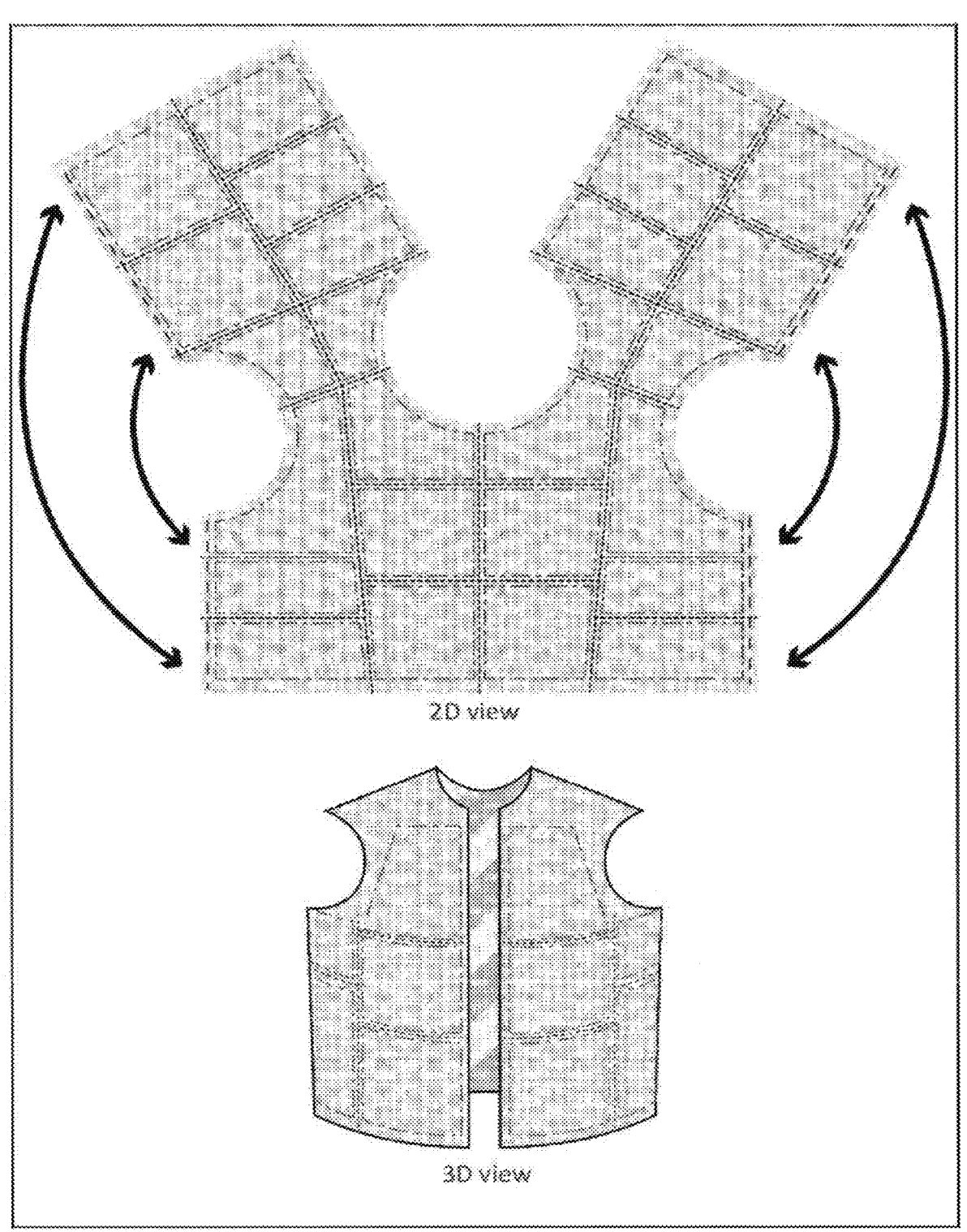
FIG. 16 illustrates a method step of an example embodi-ment wherein all pieces are assembled together into a garment.

2. Assemble all these pieces together into a garment as shown in FIG. 16.

Manufacturing Methods for a Three or Four Layer
Flameproof Material of Various Example
Embodiments with or without Adhesives for
Non-Wearable Applications FIGS. 17 through 24 represent figurative designs. Both three-dimensional (3D) and two-dimensional (2D) shaped flameproof materials can be manufactured using the described methods.

Figure 17:
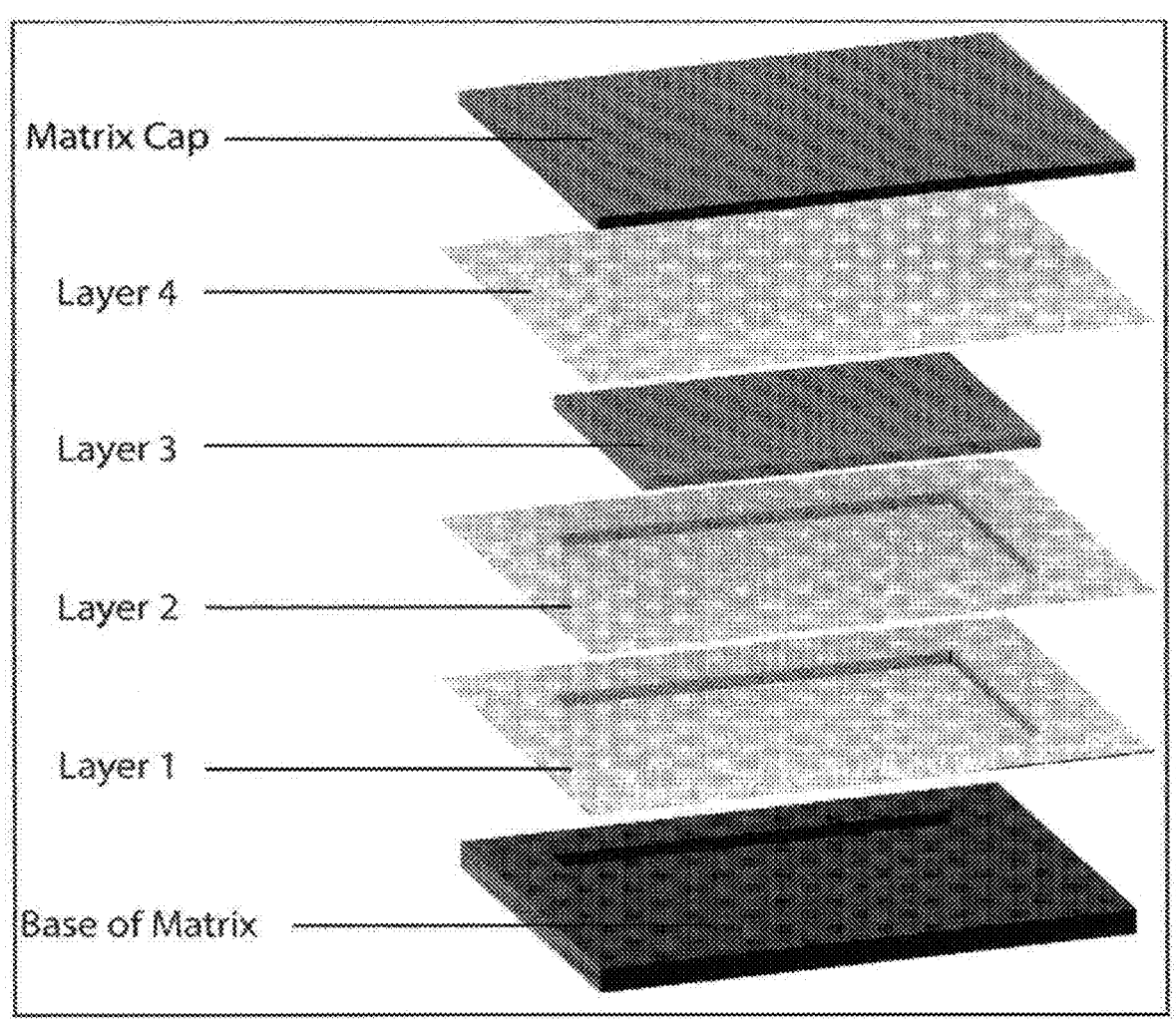
FIGS. 17 through 24 illustrate method steps of an example embodiment wherein a flameproof shell of the example embodiments can be fabricated using the manufacturing methods disclosed herein.
Figure 18:
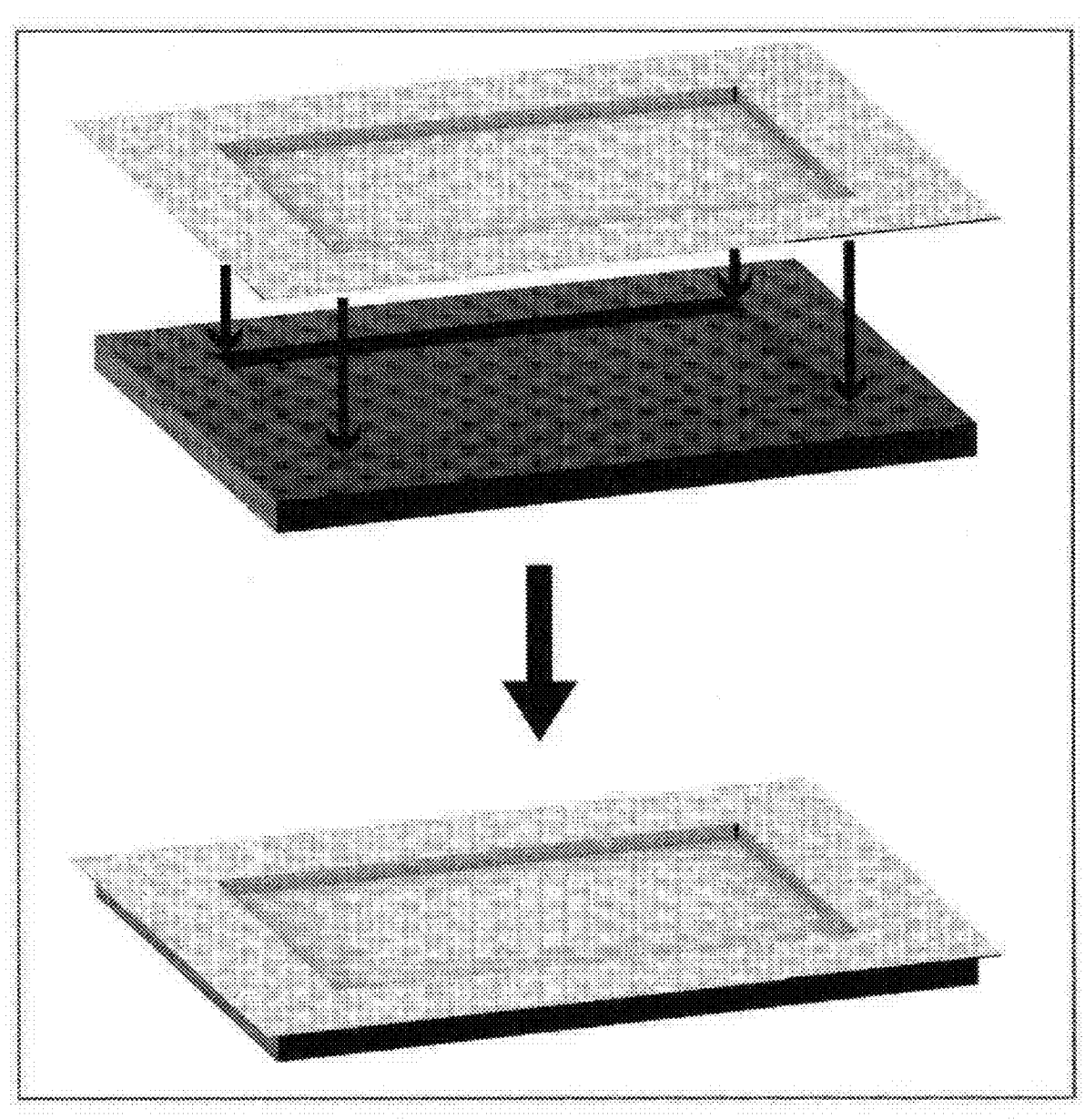
Figure 19:
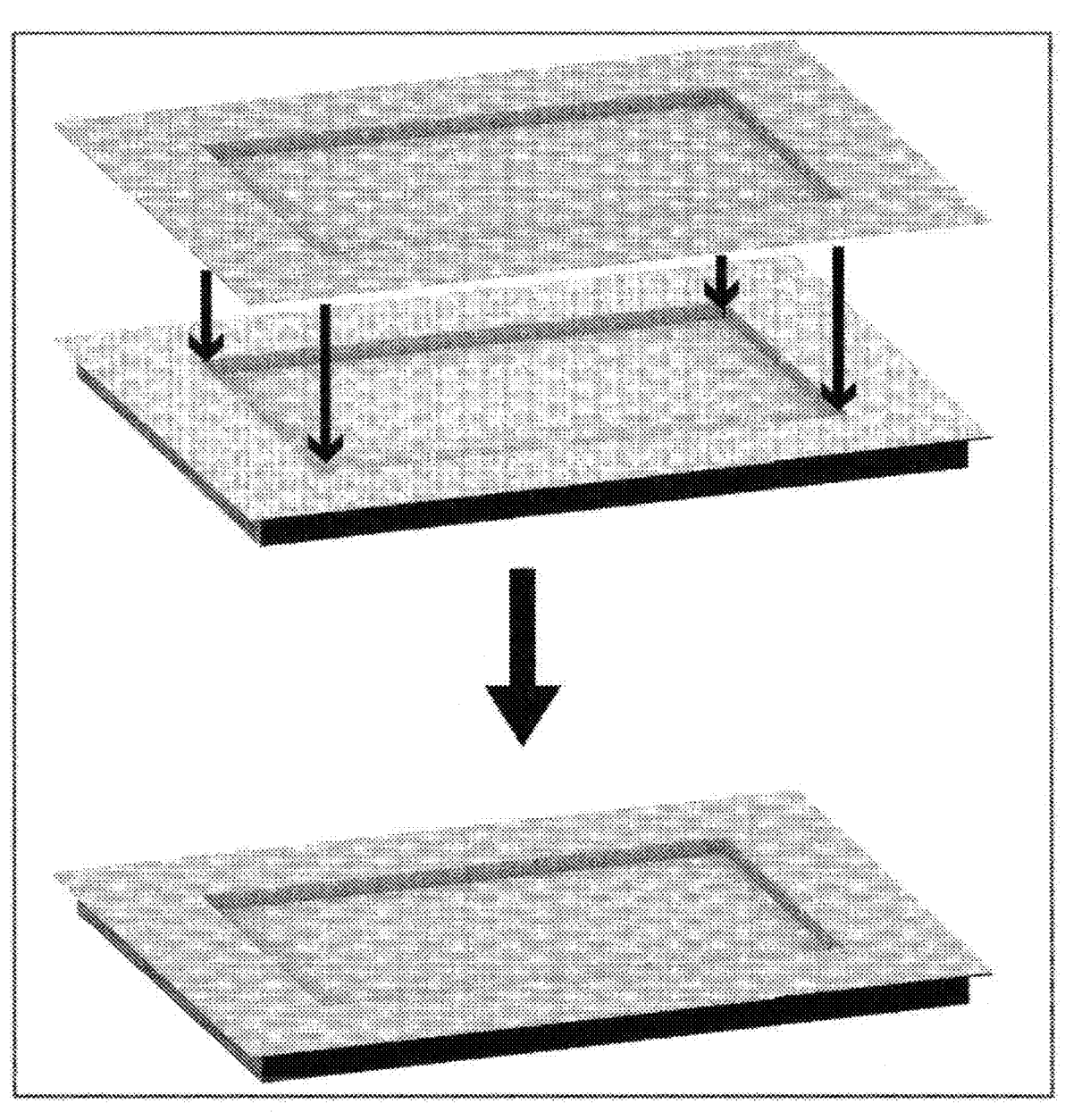
Figure 20:
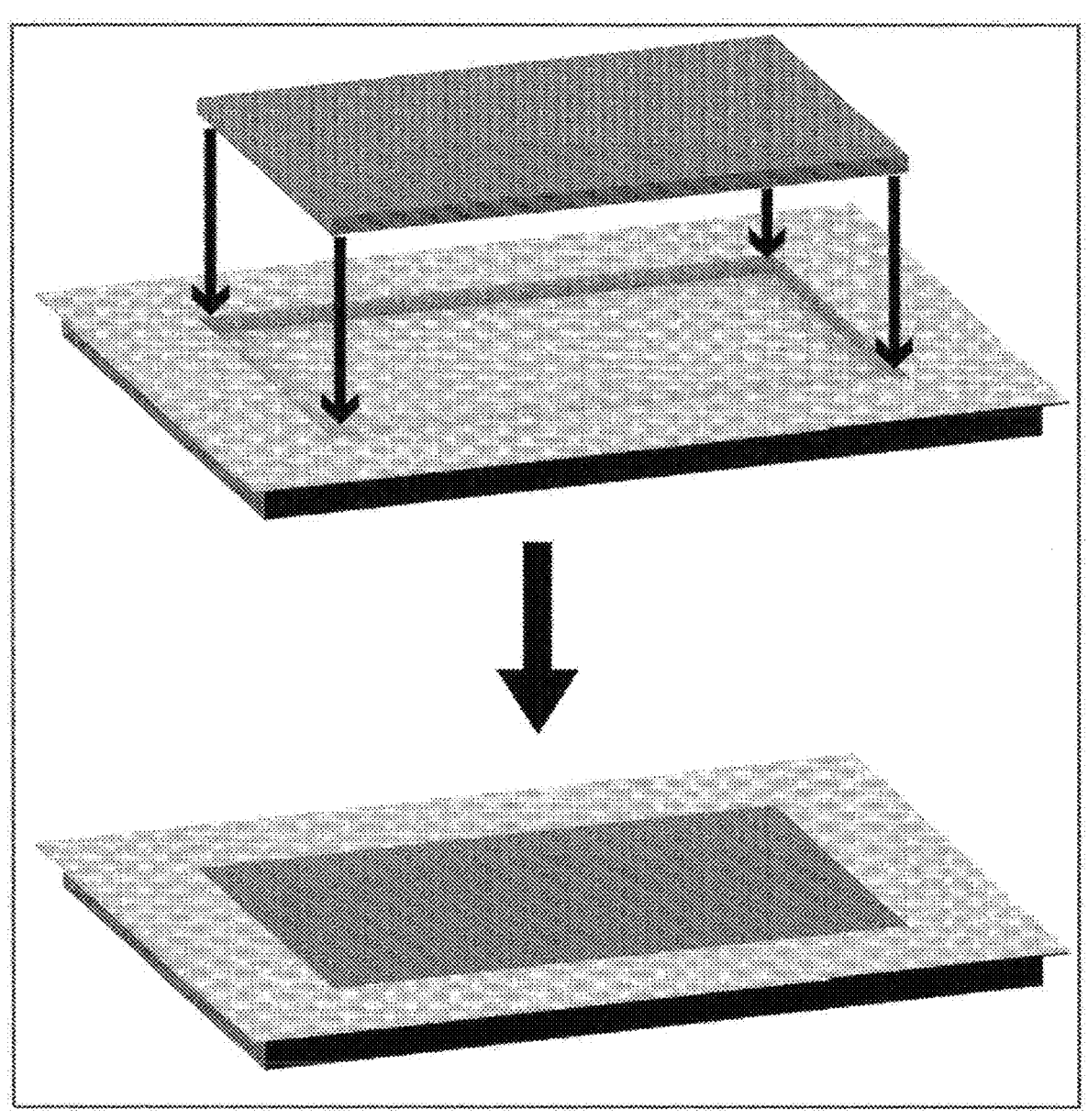
Figure 21:
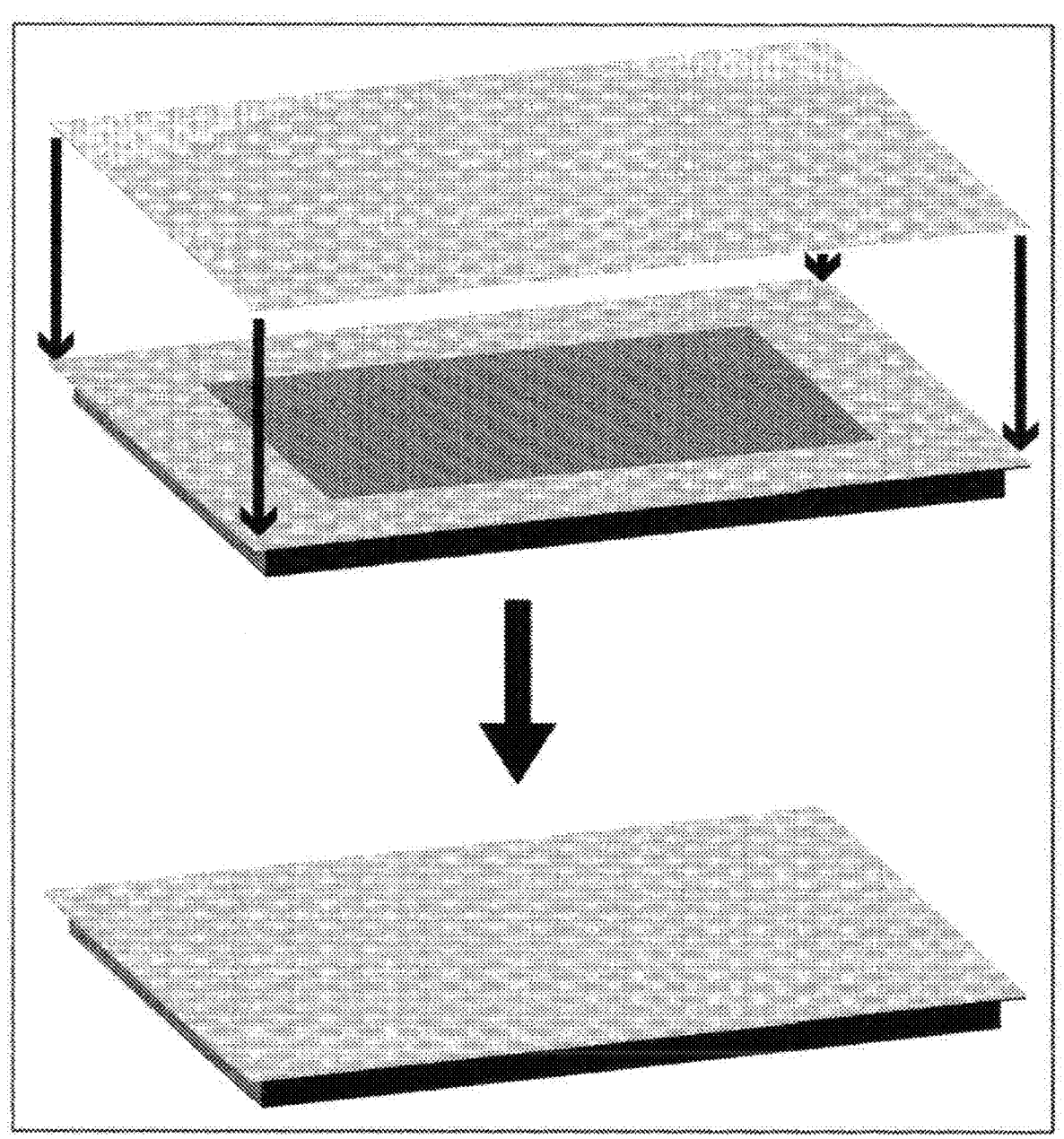
Figure 22:
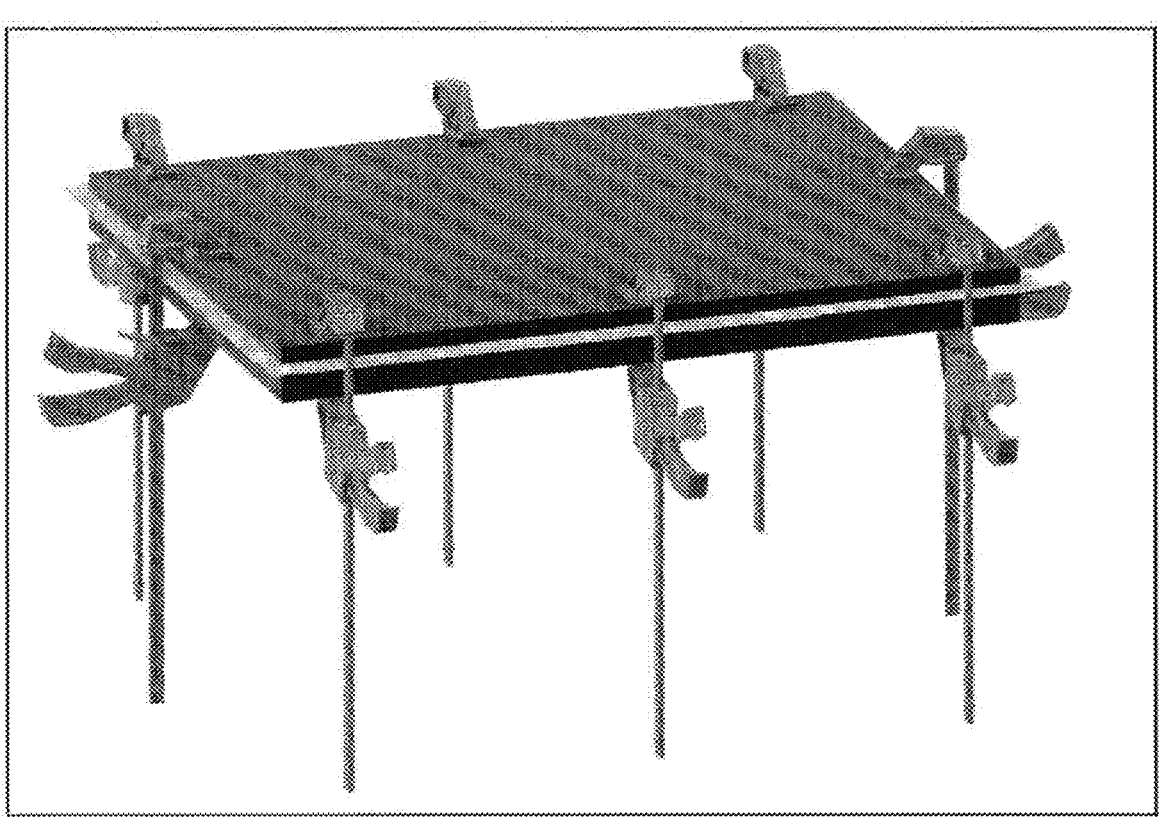
Figure 24:
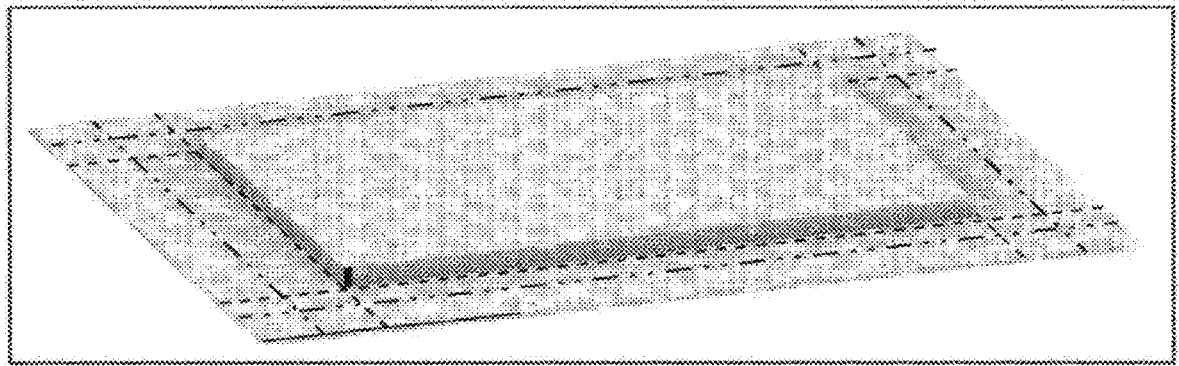

Referring now to FIGS. 17 through 24, the flameproof shell of the example embodiments can be fabricated using the manufacturing methods disclosed below. FIG. 17 illustrates some of the elements used in an example embodiment to fabricate the flameproof shell, the elements including a matrix cap, a matrix base, and several layers of materials interposed between the matrix cap and the matrix base. The fabrication process in an example embodiment includes the following operations. Any of the below operations may be omitted or performed in any reasonable order.

1. Layer 1 is placed on the Base of the Matrix with the side intended to face flame or a heat source facing towards the Internal Surface of the Base of the Matrix (See FIG. 18).

2. An adhesive (e.g., glue) is prepared and applied as a thin layer to the Layer 1 surface that is intended to face Layer 2.

3. Layer 2 is placed on the surface of Layer 1 (See FIG. 19).

4. The adhesive (e.g., glue) is prepared and applied as a thin layer to the Layer 2 surface that is intended to face Layer 3.

5. Layer 3 is placed on the surface of Layer 2 (See FIG. 20).

6. (Optional step in the case of building a 4-layer composite) The adhesive (e.g., glue) is prepared and applied as a thin layer to the Layer 3 surface that is intended to face Layer 4.

7. (Optional step in the case of building a 4-layer composite) Layer Four is placed on the surface of Layer Three (See FIG. 21).

8. The Matrix Cap is placed on the surface of Layer 3 (or Layer 4 in the case of building a 4-layer composite) and is aligned with the Base of the Matrix (See FIG. 22).

Figure 23:
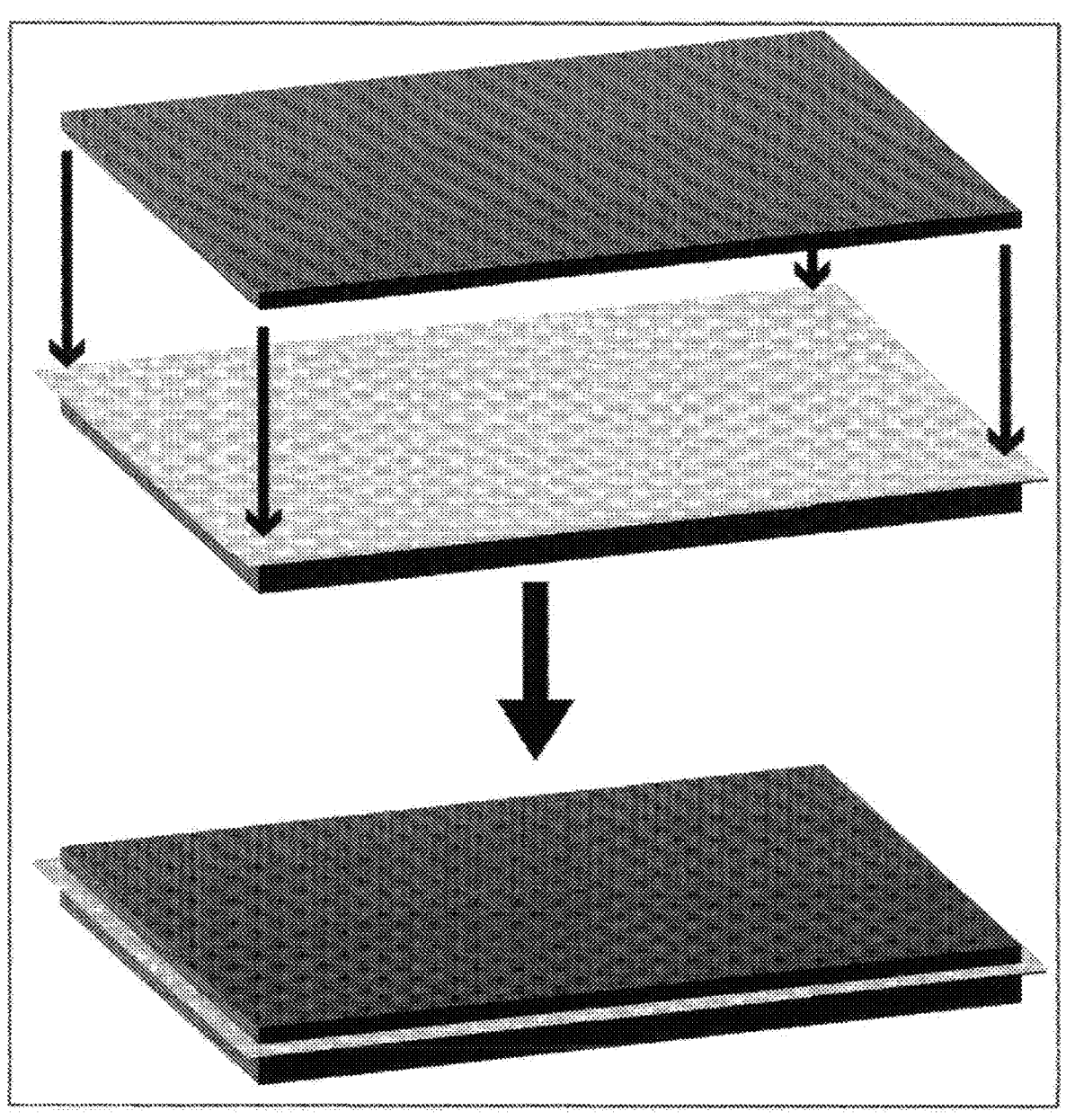
Figure 25:
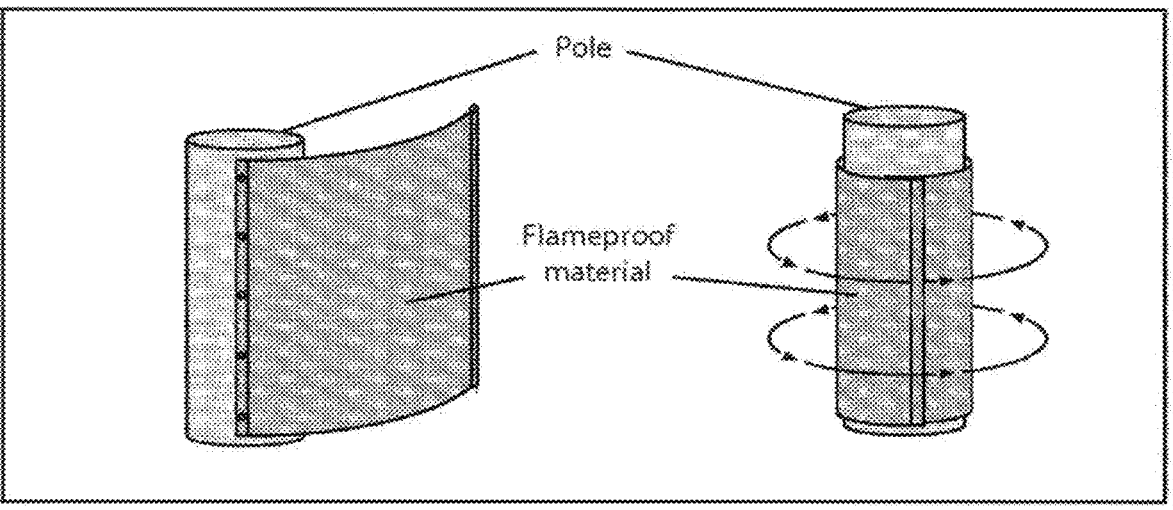
FIGS. 25 through 30 illustrate examples of various appli-cations in which the flameproof shell disclosed herein can be used.
Figure 26:
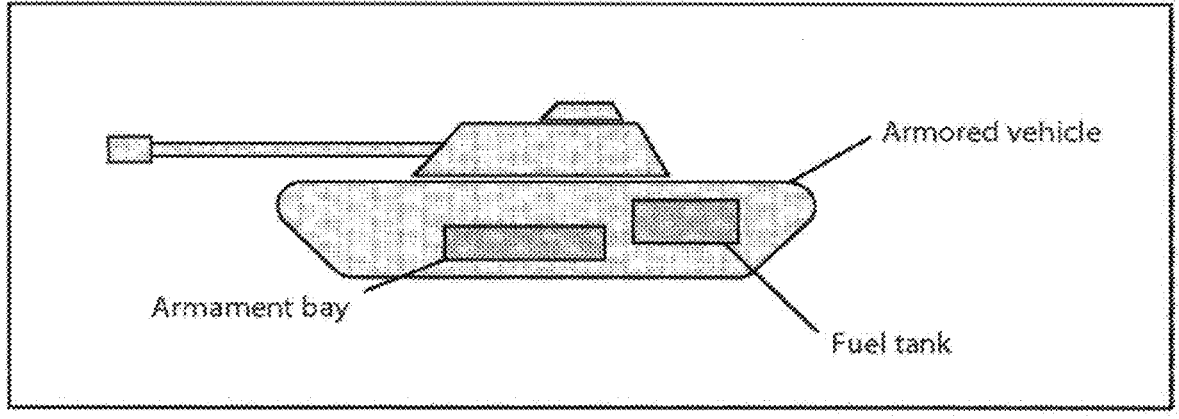
Figure 27:
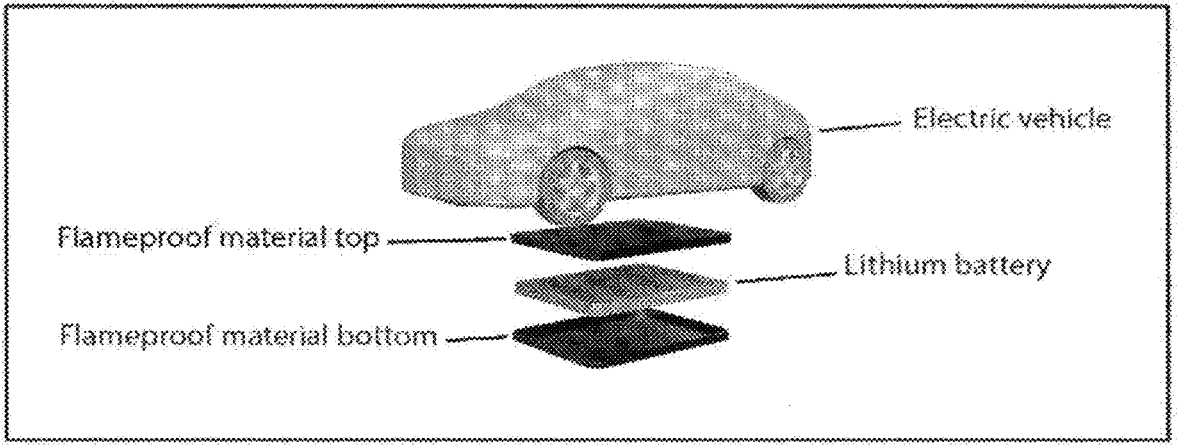
Figure 28:
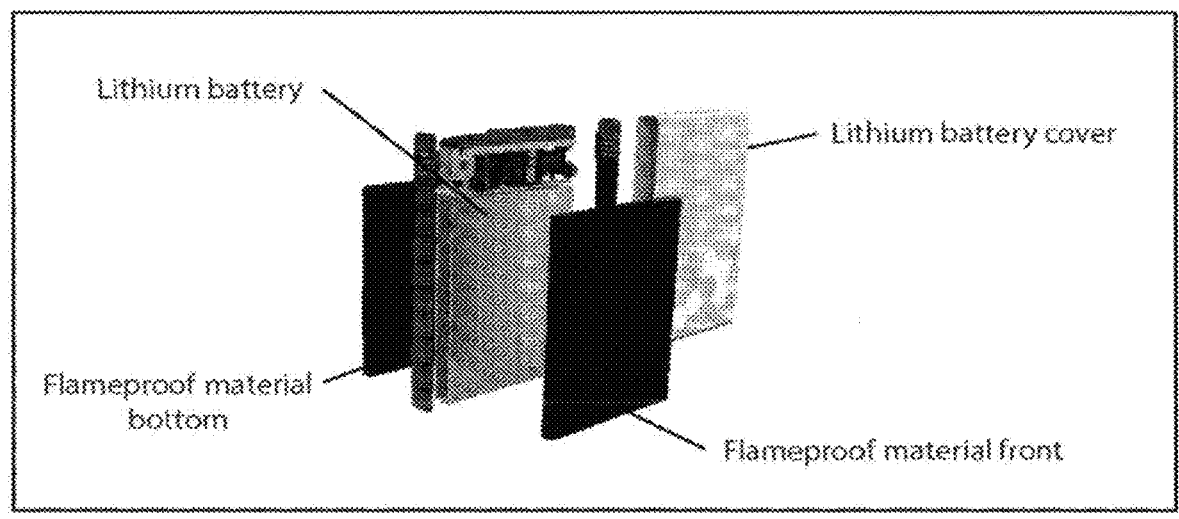
Figure 29:
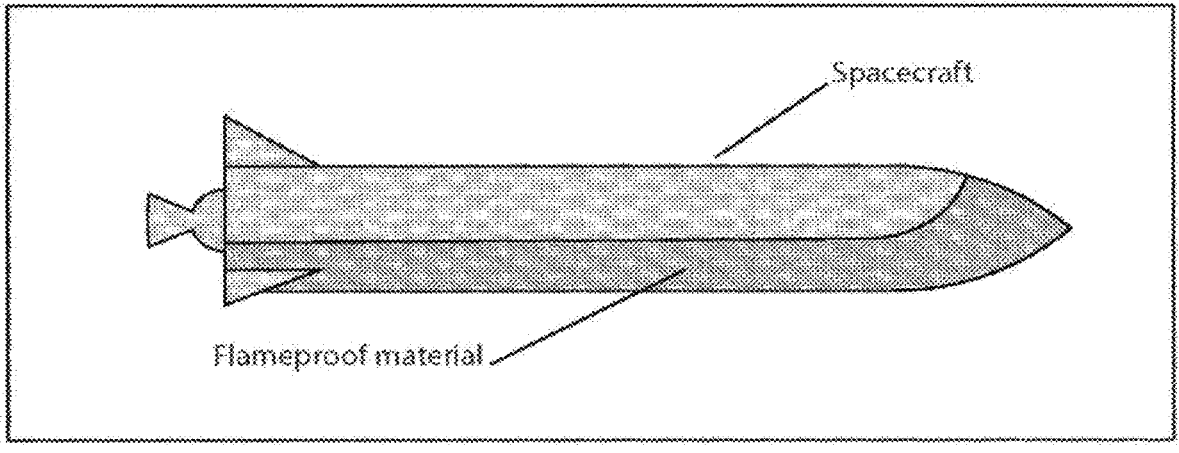
Figure 30:
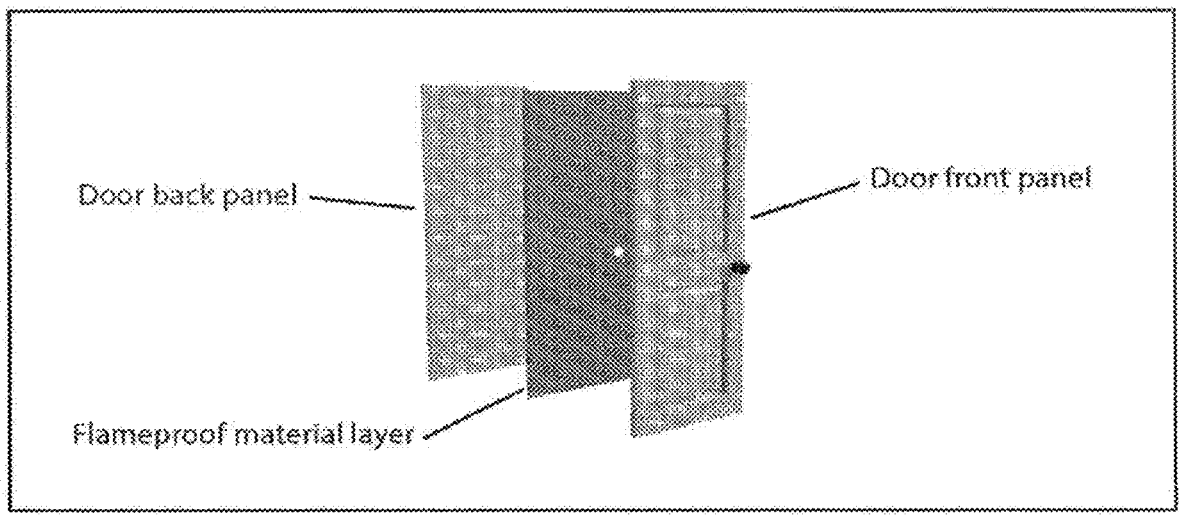

9. The Matrix Cap is secured to the Base of the Matrix and pressed together, by any means that can deliver a similar force on every side of the Matrix, including different types of clamps, pressing machines, etc. (See FIG. 23—in this case, clamps are shown in FIG. 23).

10. The matrix is left secure and pressed until the adhesive (e.g., glue) is settled after a predetermined length of time.

11. After the adhesive (e.g., glue) has settled, the pressing mechanism and fastenings are removed from the Matrix.

12. The Base of the Matrix and the Matrix Cap are separated.

13. The ready Flameproof Composite is removed from the base of the matrix (See FIG. 24).

14. The Edges of the ready Flameproof Composite are trimmed and attached by a fastener, such as aramid thread or other fire-resistant fiber, and/or adhesive (See FIG. 24).

FIGS. 31 and 32 illustrate process flow diagrams that show example embodiments of methods as described herein. Referring to FIG. 31, a method 1000 for fabricating a flameproof garment according to an example embodiment includes: partitioning a first material into garment portions, the first material being a combination of Oxidized Polyacrylonitrile (PAN) fiber and Para-aromatic polyamide (P-aramid) fiber (operation block 1010); partitioning a second material into garment portions, the second material being a combination of Oxidized PAN fiber, fire-resistant rayon (FR-rayon), and P-aramid fiber (operation block 1020); partitioning a third material into garment portions, the third material being a combination of silica aerogel and fibrous glass configured for bonding with the first or second materials, the second material being configured for bonding with the first or third materials (operation block 1030); bonding the third material with the first or second materials (operation block 1040); bonding the second material with the first or third materials (operation block 1050); and assembling the bonded materials into a flameproof garment by attaching sides of the garment portions together with a fastener (operation block 1060).

It should be noted that aerogels comprise low density solids made by removing the liquid phase of a gel and replacing it with gas. Thus, aerogels are low density, porous materials. In this manner, aerogels may be created via supercritical drying and/or freeze drying to remove the liquid phase from a gel. An aerogel may comprise 50%-99.9% porosity (i.e., the percent of volume of the aerogel is gas). In various embodiments, an aerogel may comprise from 90%-99% porosity.

Referring to FIG. 32, a method 2000 for fabricating a flameproof shell according to an example embodiment includes: placing a first material onto a matrix base, the first material being a combination of Oxidized Polyacrylonitrile (PAN) fiber and Para-aromatic polyamide (P-aramid) fiber (operation block 2010); placing a second material onto a surface of the first material, the second material being a combination of Oxidized PAN fiber, fire-resistant rayon (FR-rayon), and P-aramid fiber (operation block 2020); placing a third material onto a surface of the second material, the third material being a combination of silica aerogel and fibrous glass (operation block 2030); placing a matrix cap onto a surface of the third material (operation block 2040); applying pressure to the matrix cap for a predetermined length of time (operation block 2050); removing the matrix base and the matrix cap from combined first, second, and third materials (operation block 2060); and attaching sides of the combined first, second, and third materials together with a fastener (operation block 2070).

As used herein, percentage composition of yarns refer to mass percentage of different fibers that are blended into a single yarn. Then, these yarns may be woven into various woven structures. However, in various embodiments as discussed below, nonwoven fibrous structures are also contemplated and disclosed herein.

TABLE 1

| Composition/Materials for Example Embodiments | | | | |
| --- | --- | --- | --- | --- |
| Material | Trade name | Manufacturer | Chemical composition | Function |
| #1 | RST-75E | CarbonX/ Techtex Industries | 70% oxidized PAN (at least 50% oxidized PAN), 30% P-aramid (at least 15% P-aramid) | Flame, heat, water, vapour, chemical and tear resistance. Used for: Layer 1, 2, 3, 4 |
| #2 | CR-80-Repel | CarbonX/ Techtex Industries | 50% oxidized PAN, 30% FR-rayon (at least 20% FR-rayon), 17% P-aramid, 3% antistat polyester. | Flame, heat, water, vapour, and chemical resistance. Used for: Layers 1, 2, 3 and 4. |
| #3 | CR-59-E | CarbonX/ Techtex Industries | 86% oxidized PAN, 14% P-aramid | Flame, heat, water, vapour, and chemical resistance. Used for: Layers 1, 2, 3 and 4. |
| #4 | Pyrogel XTE 5 mm | Aspen Aerogels | 30-40%-Synthetic amorphous silica aerogel 10-20% Methylsilylated silica 40-50% Fibrous glass 1-10% Iron oxide 1-5% aluminum trihydrate | Highly heat-resistant and water-proof. Used for: Layers 2 and 3. |

TABLE 1-continued

| Composition/Materials for Example Embodiments | | | | |
| --- | --- | --- | --- | --- |
| Material | Trade name | Manufacturer | Chemical composition | Function |
| #5 | Pyrogel XTE 10 mm | Aspen Aerogels | 30-40%-Synthetic amorphous silica aerogel 10-20% Methylsilylated silica 40-50% Fibrous glass 1-10% Iron oxide 1-5% aluminum trihydrate | Highly heat-resistant and water-proof. Used for: Layers 2 and 3. |
| #6 | Woven Cotton | | 100%-cotton or other moisture-wicking fiber | Moisture Management and Ventilation. Used for: Layer 5 |
| #7 | Dragon Skin Silicone | Smooth-On | Silicone elastomer | Heat resistant two-part silicone rubber used as Glue or Adhesive |

TABLE 2A

| Configurations of Example Embodiments by Composition and Pattern of Layer Alignment (4-Layer composites) | | | | |
| --- | --- | --- | --- | --- |
| Configuration Number | Layer One | Layer Two | Layer Three | Layer Four |
| #1 | Material #1 | Material #2 | Material #4 | Material #3 |
| #2 | Material #1 | Material #3 | Material #4 | Material #2 |
| #3 | Material #1 | Material #2 | Material #4 | Material #2 |
| #4 | Material #1 | Material #3 | Material #4 | Material #3 |
| #5 | Material #2 | Material #2 | Material #4 | Material #2 |
| #6 | Material #2 | Material #3 | Material #4 | Material #3 |
| #7 | Material #2 | Material #3 | Material #4 | Material #2 |
| #8 | Material #2 | Material #2 | Material #4 | Material #3 |
| #9 | Material #3 | Material #3 | Material #4 | Material #3 |
| #10 | Material #3 | Material #3 | Material #4 | Material #2 |
| #11 | Material #3 | Material #2 | Material #4 | Material #3 |
| #12 | Material #3 | Material #2 | Material #4 | Material #2 |
| #13 | Material #1 | Material #2 | Material #5 | Material #3 |
| #14 | Material #1 | Material #3 | Material #5 | Material #2 |
| #15 | Material #1 | Material #2 | Material #5 | Material #2 |
| #16 | Material #1 | Material #3 | Material #5 | Material #3 |
| #17 | Material #2 | Material #2 | Material #5 | Material #2 |
| #18 | Material #2 | Material #3 | Material #5 | Material #3 |
| #19 | Material #2 | Material #3 | Material #5 | Material #2 |
| #20 | Material #2 | Material #2 | Material #5 | Material #3 |
| #21 | Material #3 | Material #3 | Material #5 | Material #3 |
| #22 | Material #3 | Material #3 | Material #5 | Material #2 |
| #23 | Material #3 | Material #2 | Material #5 | Material #3 |
| #24 | Material #3 | Material #2 | Material #5 | Material #2 |

TABLE 2B

| 3-Layer composites | | | |
| --- | --- | --- | --- |
| Configuration Number | Layer 1 | Layer 2 | Layer 3 |
| #25 | Material #1 | Material #4 | Material #1 |
| #26 | Material #1 | Material #4 | Material #2 |
| #27 | Material #1 | Material #4 | Material #3 |
| #28 | Material #2 | Material #4 | Material #1 |
| #29 | Material #2 | Material #4 | Material #2 |
| #30 | Material #2 | Material #4 | Material #3 |
| #31 | Material #3 | Material #4 | Material #1 |
| #32 | Material #3 | Material #4 | Material #2 |
| #33 | Material #3 | Material #4 | Material #3 |
| #34 | Material #1 | Material #5 | Material #1 |
| #35 | Material #1 | Material #5 | Material #2 |
| #36 | Material #1 | Material #5 | Material #3 |
| #37 | Material #2 | Material #5 | Material #1 |
| #38 | Material #2 | Material #5 | Material #2 |

TABLE 2B-continued

| 3-Layer composites | | | |
| --- | --- | --- | --- |
| Configuration Number | Layer 1 | Layer 2 | Layer 3 |
| #39 | Material #2 | Material #5 | Material #3 |
| #40 | Material #3 | Material #5 | Material #1 |
| #41 | Material #3 | Material #5 | Material #2 |
| #42 | Material #3 | Material #5 | Material #3 |

In various embodiments, the materials disclosed herein may take the form of one of more cables and/or tows that are woven together to form a woven fibrous structure. Woven fibrous structures may take the form of a plain weave, twill weave, and/or satin weave. Woven structures include, for example, buckram, cambric, cheese cloth, chiffon, chintz, corduroy, crepe, denim, drill, flannel, ripstop, gabardine, lawn, mulmul, muslin, poplin, sheeting, tissue, taffeta, twill, velvet, madras, and any other known or hereinafter developed woven structure.

In various embodiments, the materials disclosed herein may take the form of one of more cables and/or tows that are knit together to form a knitted fibrous structure. Knitted fibrous structures may take the form of a weft-knit and/or warp-knit.

However, in various embodiments, the cables and/or tows disclosed herein may be arranged in a nonwoven form. In that regard, in various embodiments, the materials disclosed herein may be knitted or may be arranged in a non-knitted, nonwoven configuration. In nonwoven configurations, yarns may be entangled and/or bonded together, such as through use of heat, binding chemicals, and/or mechanical means. Nonwoven fabrics include, for example, felt. Nonwoven fabrics include fabrics made via a variety of techniques, including melt-blowing, spinbinding, spinlacing, flashspinning, air-laying, and bonding.

The below table, TABLE 3, discloses various suitable materials, their content, configuration, and suitability to the given Layer, as that term is used above.

TABLE 3

| Material | Type | Subtype | Fiber content (composition) | Yarn size | Description | Used as #Layer |
|---|---|---|---|---|---|---|
| RST-75 (woven PAN/Aramid) | Woven | Ripstop | 70%-O-Pan, 30%-P-Aramid | 30 s/3 | Woven fire-resistant fabric; with plain, | 1, 2, 4, 5 |
| CR-80 (woven PAN/rayon/ aramid/ polyester) | Woven | 2 × 1 twill | 50%-O-Pan, 30%-FR Rayon 17%-P-Aramid, 3%-antistat polyester | 20 s/2 | twill or ripstop weave; fiber content of 40-95% O-Pan, 5-50% P-aramid, 0-30% | |
| C-59 (woven PAN/Aramid) | Woven | Plain | 86%-O-Pan, 14%-P-Aramid | 20 s/2 | FR-rayon, 0-10% Antistat polyester; Yarn size in the range of 10-120/1-4. | |
| CarbonX B00 | Non Woven (nonwoven PAN/Aramid) | Needle punch felt | 95%-O-Pan, 5%-P-Aramid | | Non-woven fire-resistant fabric; needle-punch felt or fleece; fiber content of 0-20% P-aramid, 80-100% O-Pan | 1, 2, 4, 5 |
| CarbonX BO3RC | Non Woven (nonwoven PAN) | Needle punch felt | 100% O-pan | | | |
| Aramid blend fabric | Woven (woven meta-aramid/ P-aramid) | Plain or twill | 0-30% Meta-Aramid 70-100% P-aramid | | Woven Aramid fabric, with plain or twill weave. Yarn size 5-120/1-4, or 1-12k. | 2, 3, 4 |
| Pyrogel XTE | Aerogel (silica aerogel) | Blanket | 30-40%-Synthetic amorphous silica 10-20%-Methylsilylated silica 40-50%-Fibrous glass 1-10%-Iron Oxide 1-5%-Aluminum Trihydrate | | Amorphous silica 10-70% Methylsilylated silica 5-30% Trimethylated silica 20-60% Magnesium-silicate 20-80% Glass fiber 1-60% Magnesium hydroxide <7% Aluminum hydroxide <7% | 2, 3, 4 |
| Pyrogel XTF | Aerogel (silica aerogel) | Blanket | 40-55%-Trimethylated Silica 40-50%-Fibrous Glass 4-6%-Titanium dioxide <5%-Aluminum Hydroxide <5%-Magnesium Hydroxide | | Titanium dioxide 2-10% Silicone Carbide 1-20% Iron Oxide-1-15% Aluminum Trihydrate 1-10% | |
| AlkegenFyre | Aerogel | Blanket | Amorphous magnesium-silicate wool 50-70% (SiO2 70-80%; MgO 18-27%;) Amorphous Silica 20-40%, Glass wool 1-10% Silicone Carbide 1-10%; | | | |
| Smooth On DragonSkin | | flame rated | Addition Cure Silicone Rubber Compound | | | Between layers as adhesive |

Tows containing aramid and PAN may be sized between 0.1 K to 500 K, between 1 K and 24 K, and between 3 K and 12 K. Tows containing rayon, polyester, aramid and PAN may be sized between 0.1 K to 48 K, between 1 K and 24 K, and between 3 K and 12 K. Tows containing oxidized PAN prior to combination with aramid may be sized between 0.1 K to 500 K, between 1 K and 24 K, and between 3 K and 12 K. Aerogels as recited herein may have a thickness of between 0.001 mm to 10 cm, from 0.1 mm to 5 cm, and from 1 mm to 4 cm. Any of the woven materials as used herein may be impregnated with various amorphous materials such as epoxies, resins, graphite, carbon pitch, ceramic materials, elemental silicon, silicon carbide, and other suitable materials to affect thermal or structural properties. As used herein, "O-PAN" refers to oxidized PAN, though in various embodiments, PAN may be used in place of O-PAN. Moreover, carbonized PAN may be used in various embodiments in place of PAN or O-PAN. Carbonized PAN is PAN that has been heat treated so that all or nearly all the PAN has been converted into carbon fiber.

In various embodiments, Layers 1, 2, 3, 4, and 5 may be stacked upon a tool and coupled through any suitable method. Layers 1, 2, 3, 4, and 5, in various embodiments, may be at least partially coextensive over a plane of another Layer. In this configuration, one Layer may exist in a different plane (an xy plane, for example, displaced in the z direction) and at least partially overlap (i.e., be coextensive with) another Layer. The term "over" with respect to Layer orientation refers to displacement in the positive z direction while "under" with respect to Layer orientation refers to displacement in the negative z direction.

In various embodiments, bonding is effected through the use of heat and/or mechanical compression in a z direction. In various embodiments, clamps or other compression devices may be used to bind the layers together. In further embodiments, one or more fasteners may be used to couple the layers together, for example, rivets, bolts, or other fasteners. In still further embodiments, amorphous materials such as epoxies, resins, graphite, carbon pitch, ceramic materials, elemental silicon, silicon carbide, and other suitable materials may be impregnated into the layered structure through, for example, a vacuum infiltration. The amorphous materials may be cured or otherwise hardened to effect binding of the layers. In still further embodiments, needles may be driven in a z direction through one or more layers, bringing fibers from each layer into one or more adjacent layers and forming cohesion between the layers.

As described here, the number of layers used varies in response to particular use cases and related factors. In various embodiments, Layers 1, 2 and 3 are fire retardant layers that include materials having a limiting oxygen index (LOI) above 21%. Ambient air at sea level is typically thought to be about 21%, thus materials used in Layers 1, 2, and 3 have LOI values that exceed the concentration of oxygen at sea level. For example oxidized PAN and aramid both have LOI values above 21%. Layer 1, in various embodiments, contains the greatest concentration of oxidized PAN relative to Layers 2 and 3, though in various embodiments Layer 3 contains the greatest concentration of oxidized PAN relative to Layers 2 and 1. Layer 1, which is configured to face a source of heat, is configured, in various embodiments, to have a LOI above 21% and contains the greatest concentration of aramid fiber relative to Layers 2 and 3. Aramid has a high melting point (about 500° C.), so the aramid act in part to maintain the structural integrity of Layer 1 in response to exposure to a heat source. In that regard, Layer 1 may have an aramid weight percentage of 30%, with oxidized PAN as the remainder of the material in Layer 1. Layer 2, in various embodiments, contains fire resistant rayon and/or polyester. Fire resistant rayon is rayon coated with one or more fire retardants. Use of fire resistant rayon is useful in woven constructions, but also, in various embodiments, rayon absorbs moisture, which acts to increase the heat capacity of Layer 2. Layer 3, in various embodiments, contains the highest concentration of oxidized PAN, thereby providing a high resistance to combustion.

Layers 4 and 5, which in various embodiments is an aerogel, provides an insulation layer to contain the heat from the heat source. As low density materials with low thermal conductivity, aerogels help to protect other structures from the heat of the heat source. Layer 6 is intended for moisture management, and is generally used in construction of flameproof garments. Thus, Layer 6 may be omitted in various embodiments.

Flameproof shells in accordance with various embodiments may be used in lithium battery enclosures as parts of battery assembly in electric transportation (like consumer and commercial vehicles, scooters, mopeds, e-bicycles, motorcycles, busses, aircraft and ships). Further, flameproof shell in accordance with various embodiments may be used in fireproof shipping and storage containers for lithium batteries and other dangerous goods and/or for heat and flame protective containers or boxes for storage of ammunition and explosives. Moreover, flameproof shell in accordance with various embodiments, may be used as tiles for fireproofing rooms and houses in construction, separately or as a part of wall assembly, or in door assemblies. Flameproof shells in accordance with various embodiments, may be used as fireproof tiles to provide protection to spacecraft during atmospheric reentry shield.

As disclosed herein, any material disclosed to be suitable for use for a particular layer may be combined with any other material disclosed to be suitable for use for other layers.

Flameproof shell assemblies may comprise a flameproof shell as described herein having a rigid or semi rigid support structure, whether embedded into the Layers surrounding or otherwise encasing the flameproof shell. In this manner, an exoskeleton or other support structure is used to create one or more panels. For example, in embodiments where the flameproof shell is used to encase a lithium ion battery (e.g., a battery cell, a battery module, or a battery pack), a flameproof shell comprising Layers 1, 2, 3, 4, and 5 may be encased in a heat resistant structure. In various embodiments, a rigid panel is bound to Layer 5, through an adhesive or the use of fasteners, to support the flameproof shell and allow the flameproof shell to be disposed near materials that may combust. In this regard, any manner of boxes or containers may be constructed so as to contain potentially hazardous materials. Moreover, such enclosures may be hermetically sealed and flushed with nitrogen gas, for example, to deplete oxygen stored near the potentially hazardous material. By encasing a lithium ion battery, for example, in an air tight flame proof shell assembly that has been flushed with nitrogen, combustion risk is reduced.

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, flameproof material for wearables, personal protective equipment, lithium-ion battery flame protection, and general flame protection are disclosed. Although the disclosed subject matter has been described with reference to several example embodiments, it may be understood that the words that have been used are words of description and illustration, rather than words of limitation. Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

Benefits, other advantages, and solutions to problems have been described herein regarding specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above-described concepts can be used alone or in combination with any or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible considering the above teaching.

What is claimed is:

1. A flameproof material comprising:
   a first material comprising a combination of Oxidized Polyacrylonitrile (PAN) fiber and Para-aromatic polyamide (P-aramid) fiber, wherein the first material is woven into a first layer;
   a second material comprising a combination of Oxidized PAN fiber, fire-resistant rayon (FR-rayon), and P-aramid fiber, wherein the second material is woven into a second layer; and
   a third material comprising a combination of silica aerogel and fibrous glass,
   wherein the first material is disposed coextensive across substantially an entire first planar area over a plane of the second material,
   wherein the third material is disposed coextensive across substantially an entire second planar area under a plane of the second material,
   wherein the first layer, second layer, and third layer define generally parallel, planar interfaces that are bonded together across the entire first planar area and the second planar area by at least one of adhesive bonding or compression in a z-direction.

2. The flameproof material of claim 1, further comprising a fourth material comprising a combination of Oxidized PAN fiber and P-aramid fiber in a composition different from the first material, the fourth material disposed coextensive across substantially an entire planar area under a plane of the second material, the fourth material being a discrete sheet bonded to the second layer across the entire second planar area.

3. The flameproof material of claim 2, further including a fifth material comprising a moisture-wicking fiber, the fifth material disposed coextensive across substantially a fourth entire planar area under a plane of the third material, the fifth material being a discrete sheet.

4. The flameproof material of claim 2, wherein the second material is coupled to the fourth material and wherein the third material is coupled to the fourth material.

5. The flameproof material of claim 4, wherein the second material is coupled to the fourth material by at least one of bonding with adhesive or linking with a thread.

6. The flameproof material of claim 2, further comprising a sixth material, the sixth material disposed at least partially coextensive under a plane of the third material, the sixth material comprising an aerogel, wherein the sixth material is bonded to the third material.

7. The flameproof material of claim 6, wherein the sixth material comprises amorphous magnesium-silicate wool.

8. The flameproof material of claim 1, wherein the third material includes iron oxide and aluminum trihydrate.

9. The flameproof material of claim 1, wherein the second material is coupled to the third material.

10. The flameproof material of claim 1, wherein the first material is coupled to the second material by bonding with adhesive applied as a film between across the first coextensive area.

11. The flameproof material of claim 1, wherein the first material is coupled to the second material by linking with a thread.

12. The flameproof material of claim 1, wherein the first material includes at least 50% Oxidized PAN fiber.

13. The flameproof material of claim 1, wherein the first material includes at least 15% P-aramid fiber.

14. The flameproof material of claim 1 wherein the second material includes at least 20% FR-rayon.

15. The flameproof material of claim 1, wherein the third material includes at least 30% amorphous silica and at least 40% fibrous glass.

16. The flameproof material of claim 15, wherein the third material comprises a porosity from 80%-99%, wherein the third material comprises an aerogel blanket having a thickness between 0.1 mm and 5 cm.

* * * * *